United States Patent [19]
Bingham

[11] 4,041,531
[45] Aug. 9, 1977

[54] TELEVISION SIGNAL PROCESSING APPARATUS INCLUDING A TRANSVERSAL EQUALIZER

[75] Inventor: Joseph Peter Bingham, Princeton Junction, N.J.

[73] Assignee: RCA Corporation, New York, N.Y.

[21] Appl. No.: 553,642

[22] Filed: Feb. 27, 1975

Related U.S. Application Data

[63] Continuation-in-part of Ser. No. 486,241, July 5, 1974, abandoned.

[51] Int. Cl.² .......................................... H04N 9/535
[52] U.S. Cl. ...................................... 358/37; 358/38
[58] Field of Search .............. 358/37, 38; 178/7.3 R, 178/7.5 R, DIG. 19, DIG. 34, DIG. 25, 7.2, 7.1; 333/18, 28 R, 70 T

[56] References Cited

U.S. PATENT DOCUMENTS

| | | | |
|---|---|---|---|
| 2,263,376 | 11/1941 | Blumlein et al. | 330/54 |
| 2,759,044 | 8/1956 | Oliver | 178/7.5 R |
| 2,922,965 | 1/1960 | Harrison | 178/7.5 R |
| 3,546,372 | 12/1970 | Dischert et al. | 358/37 |
| 3,629,498 | 12/1971 | Tan | 178/7.2 |
| 3,643,011 | 2/1972 | Engel et al. | 358/37 |
| 3,715,473 | 2/1973 | Tan | 178/DIG. 25 |
| 3,749,824 | 7/1973 | Sagishima | 358/38 |
| 3,752,916 | 8/1973 | Lowry et al. | 178/7.5 R |
| 3,780,215 | 12/1973 | Shibata et al. | 358/37 |
| 3,849,792 | 11/1974 | Holzrichter | 358/37 |
| 3,858,240 | 12/1974 | Golding | 358/13 |
| 3,859,544 | 1/1975 | Nero | 358/37 |
| 3,919,470 | 11/1975 | Blom et al. | 178/DIG. 25 |

Primary Examiner—John C. Martin
Attorney, Agent, or Firm—Eugene M. Whitacre; Peter M. Emanuel; Ronald H. Kurdyla

[57] ABSTRACT

Signal delaying means, included in the luminance channel of a color television receiver, are responsive to the television video signal processed in the receiver. A portion of the signal delaying means serves to equalize the time delays of signals processed in the chrominance and the luminance channels of the receiver. A plurality of differently delayed video signals are developed at signal coupling means associated with the signal delaying means. At least two of the delayed video signals, spaced apart in time by a predetermined interval inversely related to a frequency at which it is desired to relatively attenuate the video signals, are combined to determine the peaking characteristics of the luminance channel. At least one other of the delayed video signals is used to produce a signal to control the bandwidth characteristics of the luminance channel. Additional means may be provided to allow the amplitude of the output signal derived by combining the peaking and bandwidth controlling signals to be controlled so that signals processed in the luminance channel may be either peaked or depeaked, depending on the quality of the incoming video signals.

30 Claims, 19 Drawing Figures

TELEVISION SIGNAL PROCESSING APPARATUS INCLUDING A TRANSVERSAL EQUALIZER

This application is a continuation-in-part of application Ser. No. 486,241, filed July 5, 1974, now abandoned.

This invention relates to apparatus for improving the transient response of television video signal processing systems, and particularly relates to improving the sharpness or crispness of the image generated by a television receiver.

The advent of larger kinescopes for television receivers has given increased importance to the problem of improving the transient response of television video signal processing systems. In terms of picture quality, this improvement corresponds to improving transitions between tones as well as the reproduction of fine detail.

It is known that the response of video processing systems may be subjectively improved by increasing the steepness of amplitude transitions in the video signals. The response may also be improved by the generation of a preshoot just before a transition and an overshoot just after the transition so that, for example, a transition from white to black will be accentuated because the image, just before the transition, is whiter than it is in the original scene and, just after the transition, is blacker than it is in the original scene.

It is known that the steepness of amplitude transitions is primarily a function of the high frequency response of the video signal processing system. It is therefore desirable that the video processing system have a relatively wide bandwidth. However, frequently, video processing systems, such as a receiver having a relatively wide bandwidth, will produce a less sharp image than narrower bandwidth systems because the wide bandwidth systems may exhibit phase non-linearity or distortion as a function of frequency. That is, for example, because wide bandwidth systems generally have a steeper high frequency roll-off characteristic (increasing signal attenuation with increasing frequency) than narrower bandwidth systems, high frequency video signal components may be delayed more than lower frequency video signal components. Phase distortion or non-linearity is primarily manifested by the presence of undesirable unsymmetrical preshoots and overshoots and ringing in the processed video signal. Unsymmetrical preshoots and overshoots and ringing are particularly undesirable since they are generally not readily controllable. Specifically, when video signals are processed in receivers including apparatus for improving high frequency response but having uncorrected non-linear phase characteristics, the images generated in accordance with the processed video signals are not pleasing to the eye because of ringing and uncontrolled preshoots and overshoots. Thus, as a result of this phase distortion, the transient response of wide bandwidth apparatus may be poorer than would be expected.

Various types of apparatus are known in the art for improving the transient response of video processing systems. In one such apparatus lumped parameter peaking circuits are employed to improve the high frequency response of the video processing system by increasing the amplitude of high frequency components of the video signals relative to the amplitude of low frequency components. Unfortunately, lumped parameter peaking circuits in general exhibit non-linear phase characteristics as a function of frequency. Thus, unless lumped parameter peaking circuits are formed to provide for a linear phase characteristic as well as peaking, generally requiring complex and expensive circuitry, lumped parameter peaking circuits are undesirable for many applications.

In another apparatus for improving transient response, amplitude transients in the video signals are accentuated by passing the video signals through a lumped parameter circuit arranged to generate preshoots and overshoots. For example, U.S. Pat. No. 3,780,215, issued to Shibata et al. on Dec. 18, 1973, describes a circuit for generating preshoots and overshoots. In the Shibata circuit a low pass signal, generated by a low pass filter in response to the video signals, is subtracted from the video signals, suitably delayed, to generate the preshoot and overshoot signal components. Although the appearance of tonal transitions in the image will be accentuated more than those otherwise obtained, unless the low pass filter is arranged to have a substantially linear phase characteristic as a function of frequency, the image may exhibit the presence of undesirable ringing and uncontrolled preshoots and overshoots which are not pleasing to the viewer.

Color television video signals contain luminance, chrominance and sound signal portions. The luminance signal portion has a relatively wide bandwidth and extends into a lower frequency range and a higher frequency range. The higher frequency range has a relatively narrow bandwidth and includes chrominance and sound signal portions. The detail information of the image is contained in the high frequency components of the luminance signal portions. To process these signals, color television receivers include a chrominance channel for processing the chrominance signal portions and a luminance channel for processing the luminance signal portions. In order to improve the sharpness and fine detail resolution of the image, it is desirable to improve the transient response of the luminance channel by increasing the high frequency response of the luminance channel. However, since the presence of chrominance and/or sound signal portions in the luminance channel tends to result in the generation of undesirable visible patterns in the image, it is also desirable to provide means to remove chrominance and sound signal portions from the luminance channel. Heretofore, a band elimination filter or trap circuit centered around a color subcarrier frequency to remove chrominance signal portions, a trap circuit centered around an intercarrier sound frequency to remove sound signal portions, and a peaking circuit to relatively accentuate high frequency components of the luminance signal portions have been separately provided in the luminance channel. In order to reduce complexity and cost it is desirable to have the single circuit which relatively accentuates high frequency components of the luminance signal portions and which also relatively attenuates chrominance or sound signal portions or both.

Further, it may be desirable to provide for the adjustment of the peaking characteristic of the luminance channel. For example, it may be desirable to control the amplitude of certain portions (i.e., the relatively high frequency components) of the luminance signals depending on the quality of the received television signal. It may also be desirable to control whether the relatively high frequency components of the luminance signals are relatively accentuated (i.e., peaked) or relatively attenuated (i.e., depeaked) depending on the characteristics of the received signal. Thus, if the received signal previously has been processed at the transmitter to provide accentuated relatively high frequency luminance signal components, as for example in cable television (CATV) systems, or if the transmitted signal contains relatively high frequency noise components, it may be desirable to depeak, rather than peak, relatively high frequency components of the luminance signal. In any case, whether the relatively high frequency components are peaked or depeaked, it is desirable that the adjustment of the amplitude of the relatively high frequency components does not substantially affect the trapping characteristics of the luminance channel. It is also desirable that the adjustment does not affect the DC component of the video signal since the brightness of the image is related to the DC component of the video signal.

It is known in the art that a desired amplitude or phase characteristic (or both) as a function of frequency may be formed in an apparatus wherein delayed signal generated at signal coupling points (usually referred to as taps) along a delay line or like device are combined in a predetermined manner to obtain the desired characteristic. Such apparatus is described in U.S. Pat. No. 2,263,376, entitled "Electric Wave Filter, or the Like", issued to A.D. Blumlein et al. on Nov. 18, 1941; an article entitled "Transversal Filters", by H. E. Kallman, appearing in the *Proceedings of the I.R.E.*, Volume 28, Number 7, pages 302–310, July 1940; and article entitled "Selectivity and Transient Response Synthesis", by R. W. Sonnenfeldt, appearing in *I.R.E. Transactions on Broadcast and Television Receivers*, Volume BTR-1, Number 3, pages 1–8, July 1955; and an article entitled "A Transversal Equalizer for Television Circuits", by R. V. Sperry and D. Surenian, appearing in *Bell System Technical Journal*, Volume 39, Number 2, pages 405–422, March 1960. Such apparatus, sometimes called a transversal equalizer or filter, is generally useful for a variety of applications in the signal processing field. For instance, such apparatus may be found useful in horizontal and vertical aperture beam correction, as is described in U.S. Pat. No. 2,759,044, entitled "Beam Aperture Correction in Horizontal and Vertical Direction", issured to B. M. Oliver on Aug. 14, 1956. In addition U.S. Pat. No. 2,922,965, entitled, "Aperture Equalizer and Phase Correction for Television", issued to C. W. Harrison on Jan. 26, 1960, describes another apparatus of the type described in the Oliver patent wherein a reflective termination is coupled to a delay line having a plurality of taps to reduce the number of taps required. In another application of a delay line described in U.S. Pat. No. 3,749,824, entitled "Suppression Filter for Carrier-Chrominance Signals Utilizing a Tapped Delay Line", issued to T. Sagashima et al. on July 31, 1973, a reflective termination is selectively coupled to one end of a luminance channel delay line during color transmission to suppress chrominance signal portions. The delay line also serves to compensate for the time delays of signals processed in the luminance and chrominance channels.

In accordance with the present invention, signal delaying means, responsive to a television video signal having at least luminance and chrominance signal portions, is included in the luminance channel of a television video processing system. A plurality of signal coupling means are coupled to the signal delaying means fro developing a plurality of delayed video signals spaced apart in time by predetermined intervals. At least two of the delayed video, signals are combined to determine the peaking characteristics of the luminance channel. The two delayed signals are selected so that the luminance channel has an amplitude versus frequency characteristic which has relatively increased amplitudes in an upper frequency range of the luminance signal portions. At least one other of the delayed video signals is used to derive a bandwidth-determining signal. The bandwidth-determining signal is combined with the two delayed signals to form an output signal having an amplitude versus frequency characteristic which has relatively increased amplitudes in an upper frequency range of the luminance signal portions and relatively decreased amplitudes in the frequency ranges of the chrominance or sound signal portions or both.

In accordance with another feature of the present invention, a portion of the signal delaying means serves to equalize the time delays of the signals processed in the chrominance and luminance channels of a color television processing system.

In accordance with still another feature of the present invention, the two delayed video signals control the formation of preshoots and overshoots of amplitude transitions of the output signal.

In accordance with still another feature of the present invention, means are provided for controlling the amplitude of the output signal in the upper frequency range of the luminance signal portions. In relation to this feature, the two delayed signals and the bandwidth-determining signal are combined in a manner so that the amplitude of the output at DC (i.e., zero frequency) and in the range of the chrominance or sound signal portions or both are not substantially affected by adjustments of the amplitude of the output signal in the upper frequency range of the luninance signal portions.

In accordance with still another feature of the present invention, means are provided for adjusting the amplitude of the output signal to a value above or below the amplitude of the bandwidth-determining signal at a frequency in the upper frequency range of the luminance signal portions.

These and other aspects of the present invention will be best understood by the following detailed decription in conjunction with the accompanying drawing, in which:

FIG. 1 of the drawing shows, partially in block diagram form and partially in schematic diagram form, the general arrangement of a color television receiver employing an apparatus constructed in accordance with the present invention;

Figure 1:
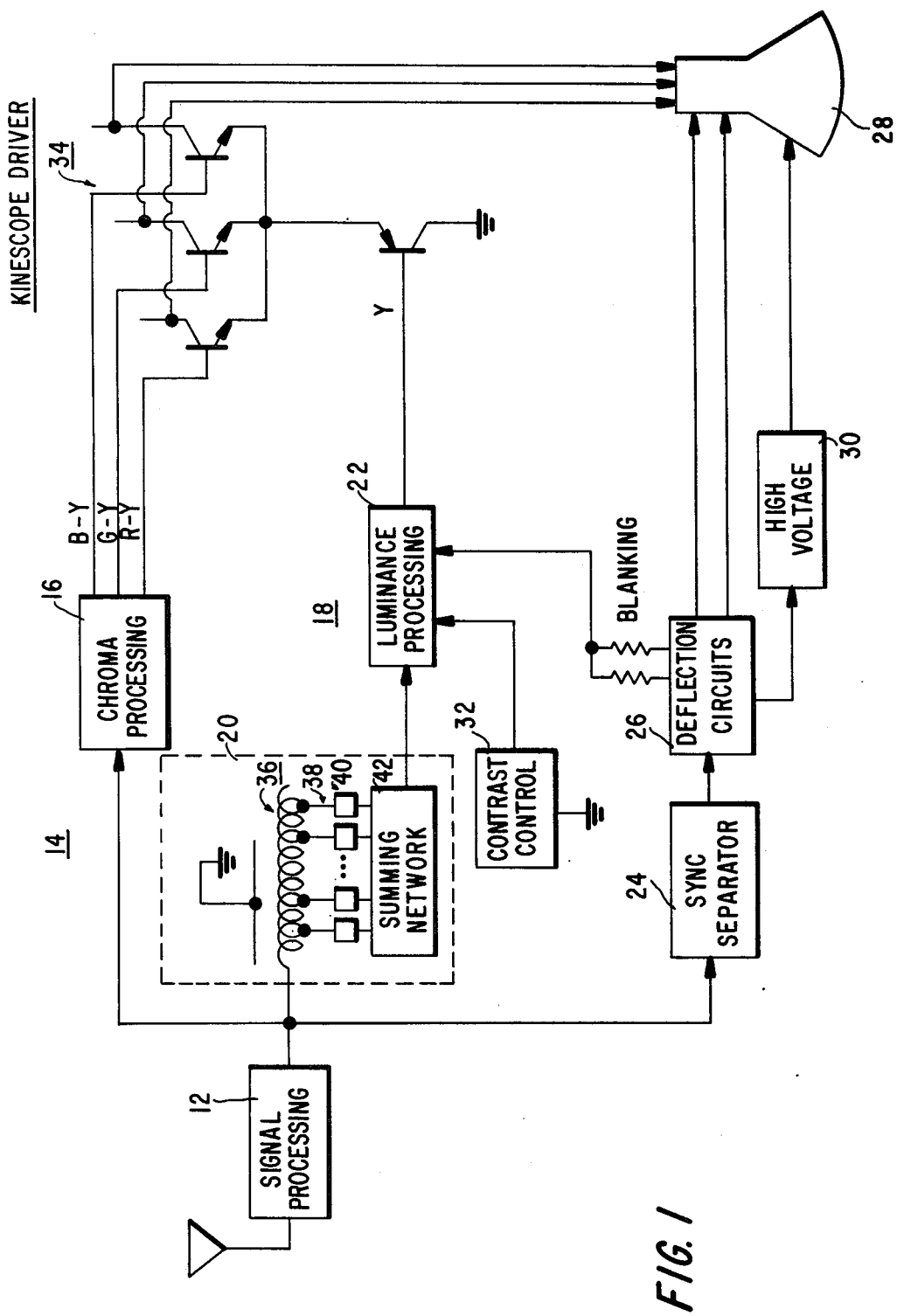

In the drawing, reference designations appearing in more than one figure of the drawing refer to the same or similar items.

In the following description, similar components appearing in different figures may be formed in the same manner.

Referring now to FIG. 1, the general arrangement of a color television receiver employing the present invention includes a signal processing unit 12 responsive to radio frequency (rf) television signals, received by an antenna, for generating, by means of suitable intermediate frequency circuits (not shown) and detection circuits (not shown), a video signal comprising chrominance, luminance, sound and synchronizing portions. The video output of signal processing unit 12 of coupled to a chrominance channel 14, including chroma processing unit 16, and to luminance channel 18, including a first luminance signal processing unit 20 and a second luminance signal processing unit 22. The output signals of chroma processing unit 16 representing, for example, B-Y, G-Y and R-Y information, are applied to kinescope driver 34, where these signals are matrixed with the output (Y) of luminance processing circuit 22. Signal processing unit 20 serves to relatively attenuate undersirable signal portions, such as chrominance or sound signal portions or both, present in luminance channel 18, while relatively increasing the amplitudes of high frequency components of the luminance signal portions to thereby improve the transient response of the television receiver. Signal processing unit 20 also desirably serves to equalize the time delays of the signals processed in chrominance channel 14 and luminance channel 18. The output of signal processing unit 20 is coupled to luminance processing unit 22 which functions to amplify and process the video signals. The amplified and processed video signals are coupled to kinescope driver 34. Contrast control 32 is coupled to luminance processing unit 22 to control the amplitude of the video signal and thereby control the contrast of the images produced by kinescope 28. One suitable contrast control arrangement is described in co-pending U.S. patent application Ser. No. 303,021, entitled "Video Signal Processing Circuits", by Jack Avins, filed Nov. 2, 1972, and assigned to the same assignee as the present invention now issued (Apr. 16, 1974) as U.S. Pat. No. 3,804,981, entitled "Brightness control". Another portion of the output signal from signal processing unit 12 is coupled to sync separator 24 which separates or strips horizontal and vertical synchronization pulses from the video signal. The synchronization pulses are coupled from sync separator 24 to deflection circuits 26. Deflection circuits 26 are coupled to kinescope 28 and high voltage unit 30 to control the deflection or sweep of an electron beam in kinescope 28 in a conventional manner. Deflection circuits 26 also function to generate a blanking signal from the horizontal and vertical pulses. The blanking signal is coupled to luminance processing unit 22 to inhibit the output of luminance processing unit 22 during the vertical and horizontal periods to insure cutoff of kinescope 28 during those respective periods.

The general circuit arrangement shown in FIG. 1 is suitable for use in a color television receiver of the type shown, for example, in RCA Color Television Service Data 1970 No. T19 (a CTC-49 type receiver), published by RCA Corporation, Indianapolis, Indiana.

Figure 9:
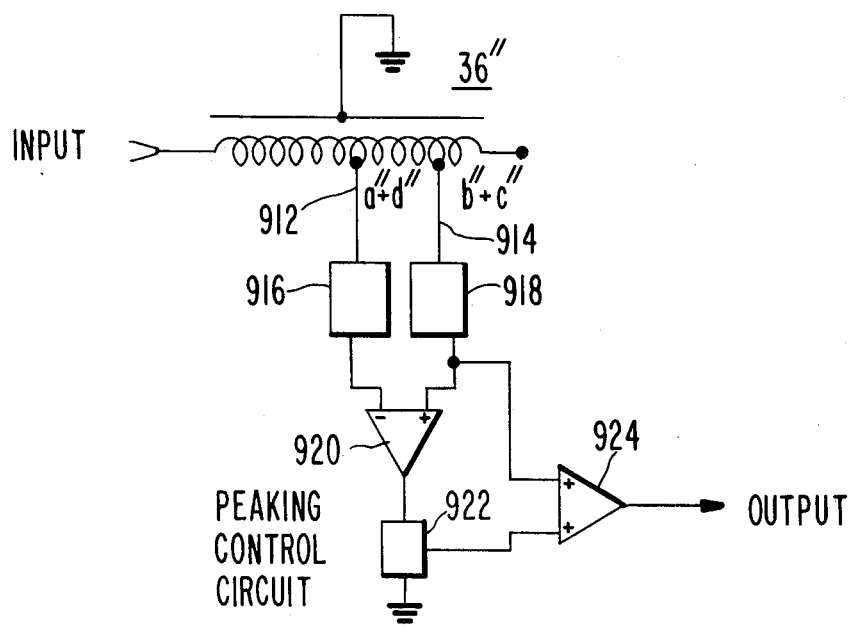
FIG. 9 is a block diagram of still another embodiment of the present invention.

Signal processing unit 20 includes signal delaying means 36, shown as a delay line, and a plurality of signal coupling means or taps 38 coupled to delay line 36. The combination of signal delaying means 36 and taps 38 is sometimes referred to as a tapped delay line. Although delay means 36 is shown as a delay line, delay means 36 may be any other suitable device for delaying a video signal. For example, signal delaying means 36 may be formed by an array of charge coupled devices (CCD's) or charged transfer devices. Although taps 38 are shown as being directly connected to delay line 36 at successive points along the delay line, they may be coupled in any other suitable manner providing for signal coupling such as capacitive coupling or the like. The video signal is delayed between successive tops 38 by respective predetermined time intervals. Taps 38 couple the delayed video signal, as developed at each of the taps 38, to a respective one of a plurality of amplitude controlling or signal weighting means 40. Amplitude controlling means 40 serve to modify the amplitude of the video signal by respective predetermined gain values to thereby generate a plurality of respective amplitude controlled or weighted signals. Weighting means 40 may be formed by any suitable gain control circuit, including, for example, an amplifier, wherein the gain may be set to predetermined values above and below unity. Although amplitude controlling means 40 are shown coupled to each tap 38 to show the general functional arrangement of signal processing unit 20, they may not be specifically provided in all cases. Thus, for example, if a predetermined gain equal to 1 is desired, the particular amplitude controlling means 40 may be only a direct connection between the respective tap 38 and summing network 42, shown in The resultant amplitude controlled signals are algebraically combined in summing network 42 to generate a video signal having an improved transient response and being relatively free of undersired signal portions, such as chrominance or sound signal portions or both. Summing network 42 may comprise any suitable circuit arrangement for algebraically adding and/or subtracting signals such as an operational or differentail amplifier arrangement or the like. Amplitude controlling means 40 may be included in summing network 42. For example, FIG. 9 shows such an arrangement. In addition, as was stated before, in a color television receiver configuration such as shownin FIG. 1, having a luminance channel and a chrominance channel, it is desirable that delay means 36 be arranged to equalize the time delays of signals processed by the chrominance and luminance channels.

Figure 2:
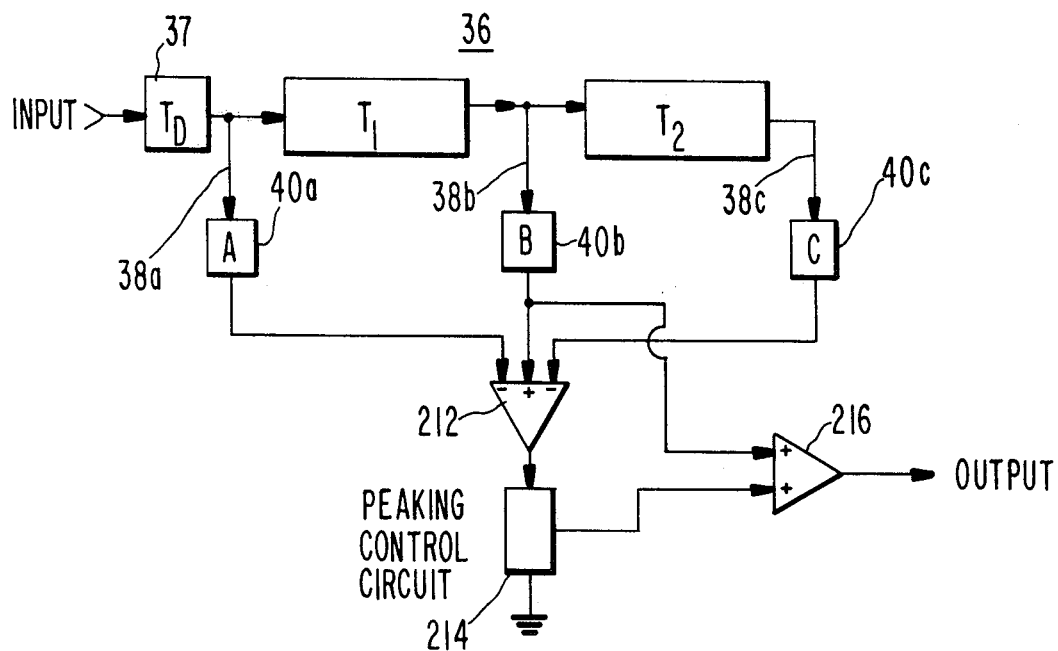
FIG. 2 is a block diagram of an embodiment of the present invention.

Referring now to FIG. 2, there is shown in block diagram form one form of signal processing unit 20 of FIG. 1. Three taps 38a, 38b and 38c are coupled to delay line 36 at spaced intervals respectively corresponding to delay time intervals $T_D$, $T_D+T_1$ and $T_D+T_1+T_2$. Delay line 36 includes a portion 37 having a time delay interval $T_D$, prior to tap 38a, selected with respect to the interval $T_1$ for equalizing the time delays of the signals processed in the luminance and chrominance channels. That is, the sum of $T_D$ and $T_1$ equals the difference between the time delays associated with the signals processed by the chrominance channel and luminance channel. In addition, it should be noted that a signal resulting from the combination of signals developed at taps symmetrically disposed around a given point of a delay line has a time delay equal to the average of the time delays of the combined signals. Therefore, if tap 38b is located midway between taps 38a and 38c so that $T_1$ and $T_2$ are equal, the output signal formed by combining signals from taps 38a and 38c will have a time delay which is equal to the time delay required to equalize the time delays of the signals processed in the chrominance and luminance channels.

Each tap 38a, 38b and 38c is coupled to a respective weighting means 40a, 40b and 40c. Weighting means 40a, 40b and 40c are amplifiers (or attenuators) or the like arranged to modify the amplitude of the video signal developed at taps 38a, 38b and 38c by respective predetermined values A, B and C. A summing means 212 is provided to algebraically subtract the amplitude controlled output signals of weighting means 40a and 40c from the amplitude controlled output signals of weighting means 40b. Summing means 212 may be formed of any suitable circuit to perform algebraic summing such as an operational amplifier, resistive matrix or the like. The output signal of summing means 212 is coupled to peaking control circuit 214 which serves to modify the amplitude of the output signal of summing means 212. Peaking control circuit 214 may be formed by any suitable adjustable gain device as in well-known in the art, such as a variable gain amplifier, and may be arranged to produce a range of gains extending from values less than unity to values greater than unity. The outputs of summing means 212 and weighting means 40b are coupled to summing means 216, which may be similar to summing means 212, where these two outputs are algebraically added to form an output signal.

Figure 3:
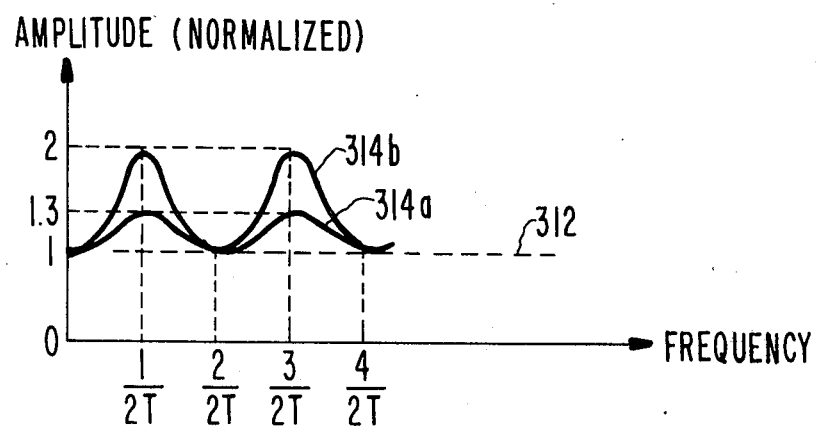
FIG. 3 is a graphical representation of frequency domain waveforms useful in understanding the operation of the circuit of FIG. 2.

The operation of the arrangement of FIG. 2 may best be understood with reference to FIGS. 3 and 4, which show, respectively, frequency domain and time domain waveforms established at various circuit points within the arrangement of FIG. 2.

Before describing FIG. 3, the amplitude versus frequency response characteristics of a tapped delay line or similar device will be briefly discussed. It will be appreciated by those skilled in the art (as is described in the aforementioned Blumlein patent) that the amplitude versus frequency transfer characteristic of a portion of a delay line which contributes a time delay T to applied signals may be expressed as a coefficient which varies exponentially as a function of frequency, i.e., $e^{-j\omega T}$, $e$ being the natural logarithm base. It should be noted that the amplitude versus frequency transfer characteristic associated with a signal developed at a tap located at a reference point where $T=0$ is flat since $e^0=1$. It should further be appreciated that the amplitude versus frequency transfer characteristic associated with algebraically adding two signals generated at respective taps symmetrically located about a reference point varies as a cosine function.

Thus, it may be seen in FIG. 3, assuming, by way of example, that time intervals $T_1$ and $T_2$ are each selected equal to a time interval T and predetermined values A, B and C are selected equal to respective relative values of ½, 1, and ½, the apparatus of FIG. 2 will have an amplitude versus frequency transfer characteristic which varies as a cosine function having a periodicity of 1/T, superimposed on a level 312. The cosine portion of the transfer characteristic is derived by adding the amplitude controlled signals developed at taps 38a and 38c. The level 312 is derived from the amplitude controlled signal developed at tap 38b. Further, by way of example, the apparatus of FIG. 2 will have an overall amplitude versus frequency transfer characteristic 314a when the gain of peaking control circuit 214 is set at 0.15 and an overall amplitude versus frequency transfer characteristic 314b when the gain of peaking control circuit 214 is set at 0.5.

From an inspection of FIG. 3 certain features of the signal processing unit of FIG. 2 may be understood. It can be seen that the locations along the frequency axis of the maxima and minima points of the amplitude versus frequency transfer characteristics of FIG. 3 may be set as desired by selecting the time interval corresponding to the separation of taps 38a and 38c of FIG. 2. It can also be seen that the bandwidth of the output signal is controlled by the combination level 312, derived from the signal developed at tap 38b, and the cosine transfer characteristic, derived by combining signals developed at taps 38a and 38c. It can further be seen that the maxima or peak amplitude of the characteristics may be controlled by adjusting the gain of peaking control circuit 214. Adjustment of peaking control circuit 214 do not, however, affect the transfer characteristic of the signal processing unit at DC (i.e., zero frequency). This feature is particularly desirable since picture brightness, which is determined by the DC components of the luminance signal, will not be affected by adjustments of peaking control circuit 214. Adjustments of peaking control circuit 214 also do not affect the amplitude of the minima points. This is desirable since peaking adjustment will not affect trapping or reduction in amplitude of undesirable signals. For example, where the time T is selected to correspond to the reciprocal of the color subcarrier frequency (e.g., 3.58 Megahertz), frequency components between zero and 3.58 MHz may be adjusted in amplitude to provide peaking without disturbing the minimum response at 3.58 MHz.

Thus, relating the description of FIGS. 2 and 3 to the color television receiver environment of FIG. 1 by selecting the time interval between taps 38a and 38c the signal processing unit of FIG. 2 may be used to relatively accentuate high frequency components of the luminance signal portions such as chrominance signal portions or sound signal portions or both appearing in the luminance channel.

Figure 4A:
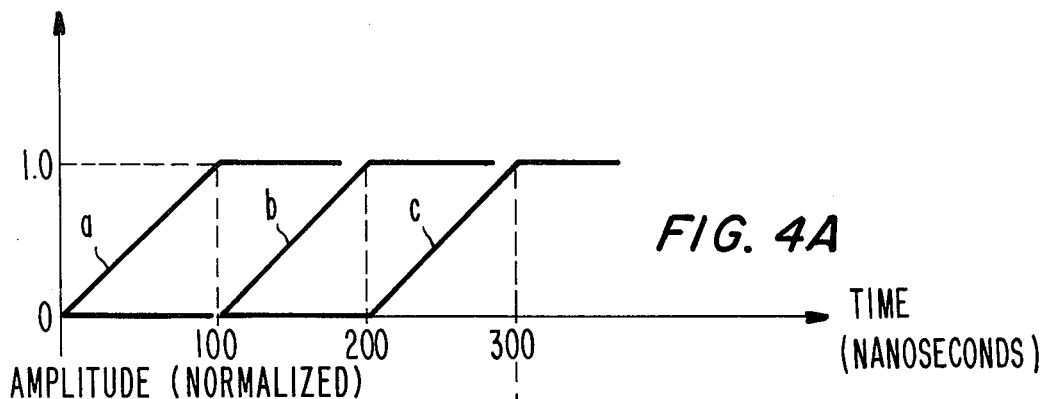
FIGS. 4A, 4B and 4C are graphical representations of time domain waveforms useful in understanding the operation of the circuit of FIG. 2.
Figure 4B:
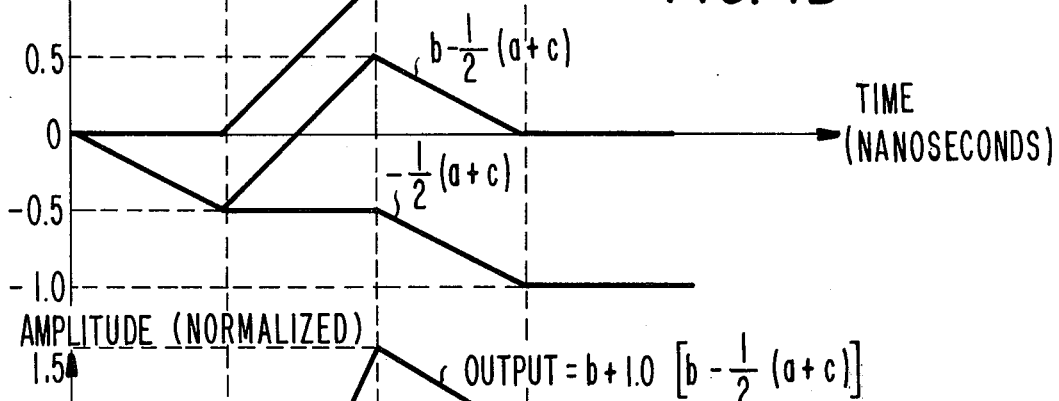
Figure 4C:
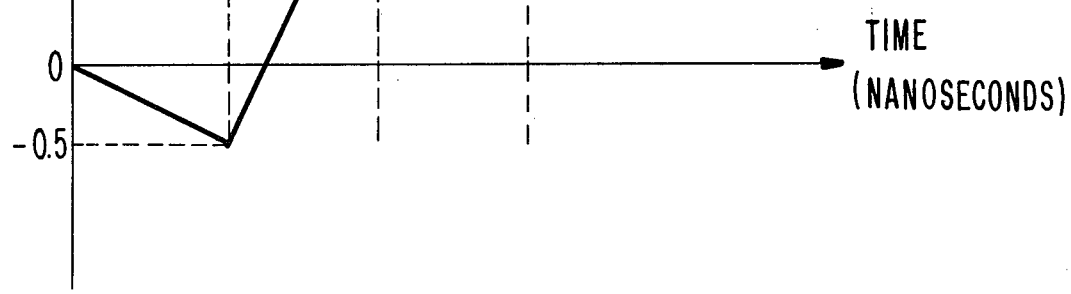

Referring now to FIGS. 4A, 4B and 4C there are shown various time domain waveforms representative of signals present at corresponding circuit points of the signal processing unit of FIG. 2. FIG. 4A is a graphical representation of the delayed video signals, labelled a, b, and c, developed, respectively, at taps 38a, 38b and 38c of the signal processing unit of FIG. 2. FIG. 4B is a graphical representation of various combinations, identified by corresponding algebraic expressions, of the delayed video signals, a, b and c, produced by the signal processing unit of FIG. 2. FIG. 4C is a graphical representation of the output signal processing unit of FIG. 2. By way of example, it is assumed that the transition time between an amplitude of 0 and an amplitude of 1 is 100 nanoseconds. For purposes of comparison, the transition time between an amplitude of 0 and 1 will be taken as the measure of steepness of a waveform. Assuming that the rise time of delay line 36 of FIG. 2 is negligible, the steepness of the delayed video signals a, b and c will also be 100 nanoseconds. Also, by way of example, it is assumed that $T_1$ and $T_2$ are each equal to 100 nanoseconds; A, B and C are respectively equal to ½, 1 and ½; and the gain of peaking control circuit 214 is set equal to 1. Referring now to FIG. 4C, it may be seen that the output signal has a preshoot (amplitude below 0) and an overshoot (amplitude above 1) of equal magnitude and equal time duration. It may also be seen that the output signal has a steeper amplitude transition than the amplitude transition of the input video signal. It should be noted that the amplitude of the preshoot and overshoot may be controlled by selection of predetermined values A and C while the duration of the preshoot and overshoot may be controlled by selection of the time intervals between taps 38a, 38b and 38c. It should be further noted that the steepness of the amplitude transition and the amplitudes of the preshoot and overshoot of the output signal may be controlled by selection of the gain of peaking control circuit 214.

It is noted that generation of preshoots and overshoots by a circuit is related to the phase linearity of the circuit as a function of frequency and that the generation of equal preshoots and overshoots corresponds to a substantially linear phase versus frequency characteristic. The phase versus frequency characteristic of the peaking circuit of FIG. 2 may be controlled by controlling the generation of the amplitude controlled signals associated with taps 38a and 38c. For example, although in the example described above the time intervals $T_1$ and $T_2$ were selected to be equal, it may be desirable that the time intervals $T_1$ and $T_2$ be selected to be unequal to produce a preshoot and an overshoot having unequal time durations to compensate for phase versus frequency non-linearities in other portions of the video signal processing system. Similarly, it may be desirable to select the predetermined values A and C to be unequal to compensate for phase versus frequency non-linearities in other portions of the video signal processing system.

By selection of predetermined values A and C and the time intervals corresponding to the separation of taps 38a and 38b and 38c, amplitude transitions of the luminance signal may be accentuated by the generation of controlled preshoots and overshoots. By the selection of the gain of peaking control circuit 214 the steepness of amplitude transitions in the luminance signal may be controlled.

With reference to FIG. 3, if it is desired to have a minimum amplitude at the color subcarrier frequency, e.g., at 3.58 MHz, to relatively attenuate chrominance signal portions, T should be selected to be approximately 280 nanoseconds, that is, the reciprocal of the color subcarrier frequency. By thus selecting T to be approximately 280 nanoseconds, a peak of the amplitude versus frequency characteristic of the luminance signal will occur at approximately 1.79 MHz. Where it is desirable to have the peak of the amplitude versus frequency characteristics occur at relatively higher frequency components of the luminance signal, that is, frequency components closer to the color subcarrier frequency than one-half the color subcarrier frequency (1.78 MHz), so as to tend to maximize the high frequency response of the luminance channel, while providing color subcarrier trapping, the signal processing unit of FIG. 5 may be preferred over the signal processing unit of FIG. 2.

Figure 5:
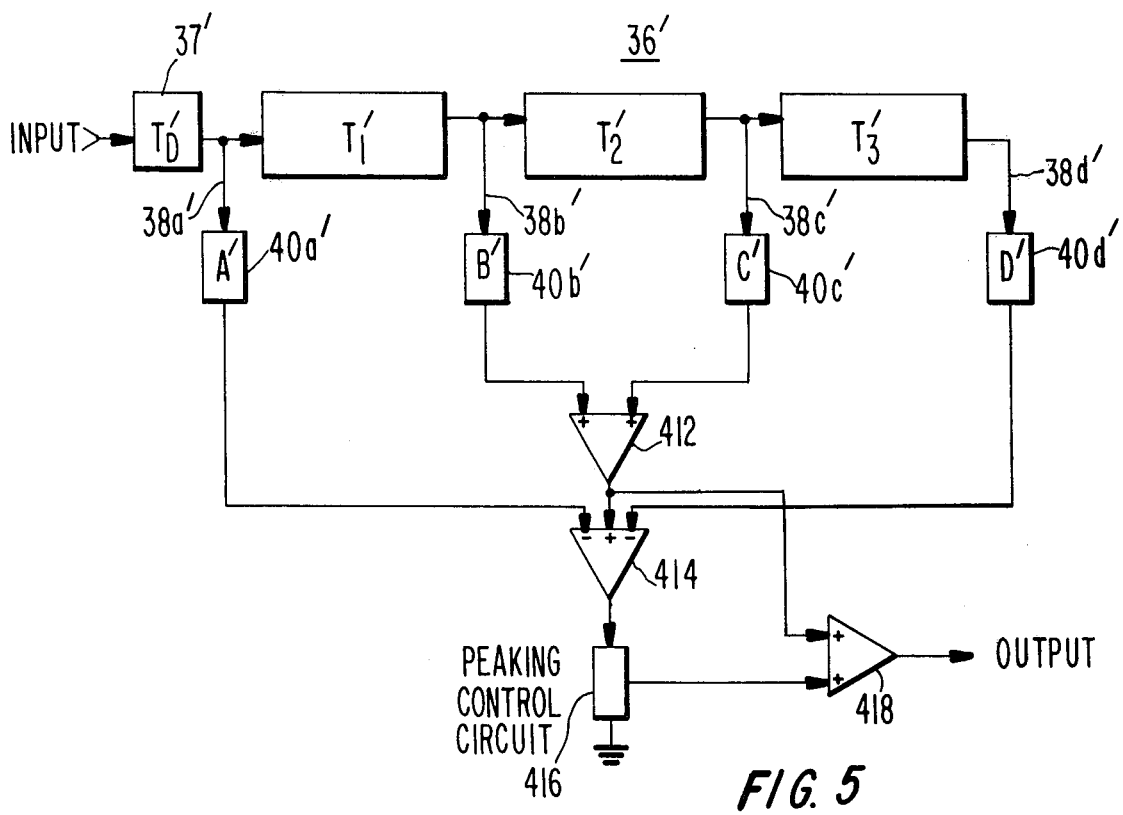
FIG. 5 is a block diagram of another embodiment of the present invention.

The embodiment shown in block diagram form in FIG. 5 is preferably utilized as signal processing unit 20 of FIG. 1, since it provides relatively high frequency peaking consistent with effective trapping. The signal processing unit of FIG. 5 comprises a delay line 36' (or other device as noted above) responsive to the video signal. Taps 38a', 38b', 38c' and 38d' are coupled to delay line 36' at spaced intervals respectively corresponding to time intervals $T_1'$, $T_2'$, $T_3'$. Delay line 36' includes a portion 37' having a time delay interval $T_D'$, prior to tap 38a' selected with respect to other portions of the line for equalizing the time delays of signals processed in the luminance and chrominance channels. For the purpose of equalizing the time delays of the signals processed in the luminance and chrominance channels, it is desirable that the sum of $T_D'$, $T_1'$ and $T_2'/2$ equal the difference between the time delays of the signals processed in the chrominance and luminance channels. In addition, since a signal resulting from the combination of signals developed at taps symmetrically disposed around the midpoint of a delay line has a time delay equal to the average time delays of the combined signals, if time intervals $T_1'$ and $T_3'$ are selected to be equal, the output signal will have a time delay which is equal to the time delay required to equalize the time delays of the signals processed in the chrominance and luminance channels.

Each tap 38a', 38b', 38c' and 38d' is respectively coupled to a respective weighting means 40a', 40b', 40c' and 40d'. Weighting means 40a', 40b', 40c' and 40d' serve to modify the amplitude of the video signal by respective predetermined values A', B', C' and D'. The amplitude controlled or weighted output signals of the center two weighting means, 40b' and 40c', corresponding to taps 38b' and 38c', are coupled to summing means 412 where they are algebraically added. The output signals of summing means 412 are coupled to summing means 414. The amplitude controlled output signals of the outer weighting means 40a' and 40d', corresponding to tap locations 38a' and 38d', are coupled to summing means 414, where they are subtracted from the output signal of summing means 412. The output signal of summer 414 is coupled to peaking control circuit 416 which serves to modify the amplitude of the output signal of summing means 414. The output signal of peaking control circuit 416 and the output signal of summing means 412 are coupled to summing means 418 where they are algebraically added to generate the output video signal.

The operation of the peaking circuit of FIG. 5 will be explained by way of an example wherein $T_1'$, $T_2'$ and $T_3'$ are all selected to be 140 nanoseconds, that is, one-half the reciprocal of the color subcarrier frequency, 3.58 MHz; and predetermined values A', B', C' and D' are each selected to be equal to ½.

Figure 6:
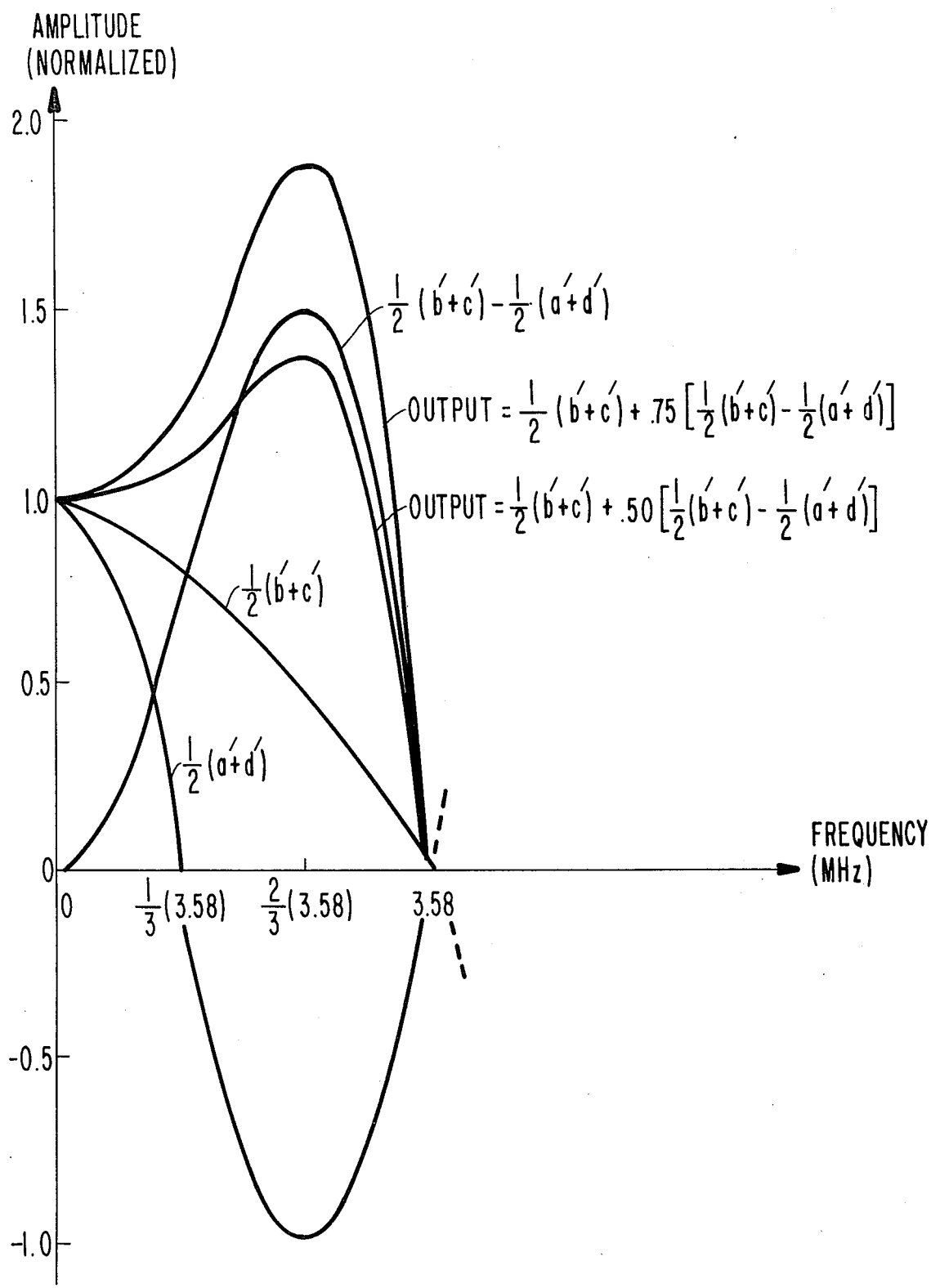
FIG. 6 is a graphical representation of frequency domain waveforms useful in understanding the operation of the embodiment of the present invention shown in FIG. 5.

Referring now to FIG. 6, there are shown various frequency domain waveforms associated with the peaking circuit of FIG. 5. These waveforms are identified by algebraic expressions representing combinations of the delayed video signals, identified as a', b', c' and d', developed, respectively, at tap locations 38a', 38b', 38c' and 38d'. The output is shown for two gain settings of peaking circuit 416, that is, at 50 percent and at 75 percent. In examining FIG. 6, it should be recalled that, as was explained above, algebraically summing pairs of amplitude controlled signals results in the generation of an amplitude versus frequency transfer characteristic which follows a cosine law. Thus, when the amplitude controlled signals corresponding to taps 38a' and 38d', separated by a time interval equal to 3×140 nanoseconds, are algebraically added, a cosine amplitude versus frequency characteristic, indicated by the expression $\frac{1}{2}(a' \times d')$, results. This characteristic has a recurrence rate of 4/3×3.58 MHz. Similarly, when the amplitude controlled signals, corresponding to taps 38b' and 38c', separated by a time interval equal to 140 nanoseconds, are algebraically added, a cosine amplitude versus frequency characteristic, indicated by the expression $\frac{1}{2}(b'+c')$, results. This characteristic has a recurrence rate of 4×3.58 MHz.

From an examination of FIG. 6, it can be seen that the combination of amplitude controlled signals associated with taps 38a' and 38d' results in the formation of an amplitude versus frequency transfer characteristic, indicated by $\frac{1}{2}(a'+d')$ in FIG. 6, which controls accentuation or peaking of the output signal. It can also be seen that the combination of amplitude controlled signals associated with taps 38b' and 38c' results in the formation of an amplitude versus frequency transfer characteristic, indicated by $\frac{1}{2}(b'+c')$ in FIG. 6, which, when combined with the peaking controlling characteristic, controls the bandwidth of the output signal. It can be further seen that the peak of the amplitude versus frequency transfer characteristic varies with the gain setting of the peaking control circuit 416. It should be noted that the adjustments of peaking control circuit 416 do not affect the amplitude of the characteristic at DC (i.e., zero frequency) and consequently, picture brightness will not be affected by adjustments of peaking control circuit 416. It should also be noted that the adjustments of peaking control circuit 416 do not substantially affect the trapping (minimum response) frequency.

The choice of the delay time intervals $T_1'$, $T_2'$ and $T_3'$ at 140 nanoseconds is advantageous since it produces an output signal having an amplitude versus frequency characteristic having a peak amplitude at a relatively high frequency, approximately 170×3.58 MHz (i.e., 2.4 MHz) while providing effective 3.58 MHz trapping. It should be noted, however, that the values given by way of example may be modified as required to suit particular applications. For instance, it may be desirable to select $T_2'$ to equal 110 nanoseconds and select $T_1'$ and $T_3'$ to equal 140 nanoseconds. In this case the amplitude versus frequency characteristic of the output signal will have a value substantially 0 at approximately 4.5 MHz, while having a peak amplitude at approximately 170×3.58 MHz (i.e., 2.4 MHz). Thus, the signal processing apparatus of FIG. 5 may be modified so that frequency components in the range of the chrominance and sound signal portions of the video signal are relatively attenuated while relatively high frequency components of the luminance signal portion may be relatively increased in amplitude.

Thus, by algebraically combining amplitude controlled signals in a predetermined manner, the peaking circuit of FIG. 5 provides for the relative attenuation of chrominance or sound signal portions or both while relatively accentuating the amplitude of relatively high frequency components of the luminance signal portions.

Referring now to FIGS. 7A, 7B and 7C there are shown various time domain waveforms associated with the peaking circuit of FIG. 5. FIG. 7A is a graphical representation of the delayed video signals, labelled a', b', c' and d', respectively developed at taps 38a', 38b', 38c' and 38d' of the signal processing unit of FIG. 5. FIG. 7B is a graphical representation of various combinations of the delayed video signals a', b', c' and d', produced by the signal processing unit of FIG. 5. FIG. 7C is a graphical representation of the output signal of the signal processing unit of FIG. 5. By way of example, it is assumed that the input video signals have a transition time between the amplitudes of 0 and 1 of 280 nanoseconds. If the rise time of delay line 36' is assumed to be negligible, the transition time of the delayed video signals a', b', c' and d' is also 280 nanoseconds. For the purpose of clarity, only an output signal for a gain setting of peaking control circuit 416 equal to 1 is shown.

Figure 7:
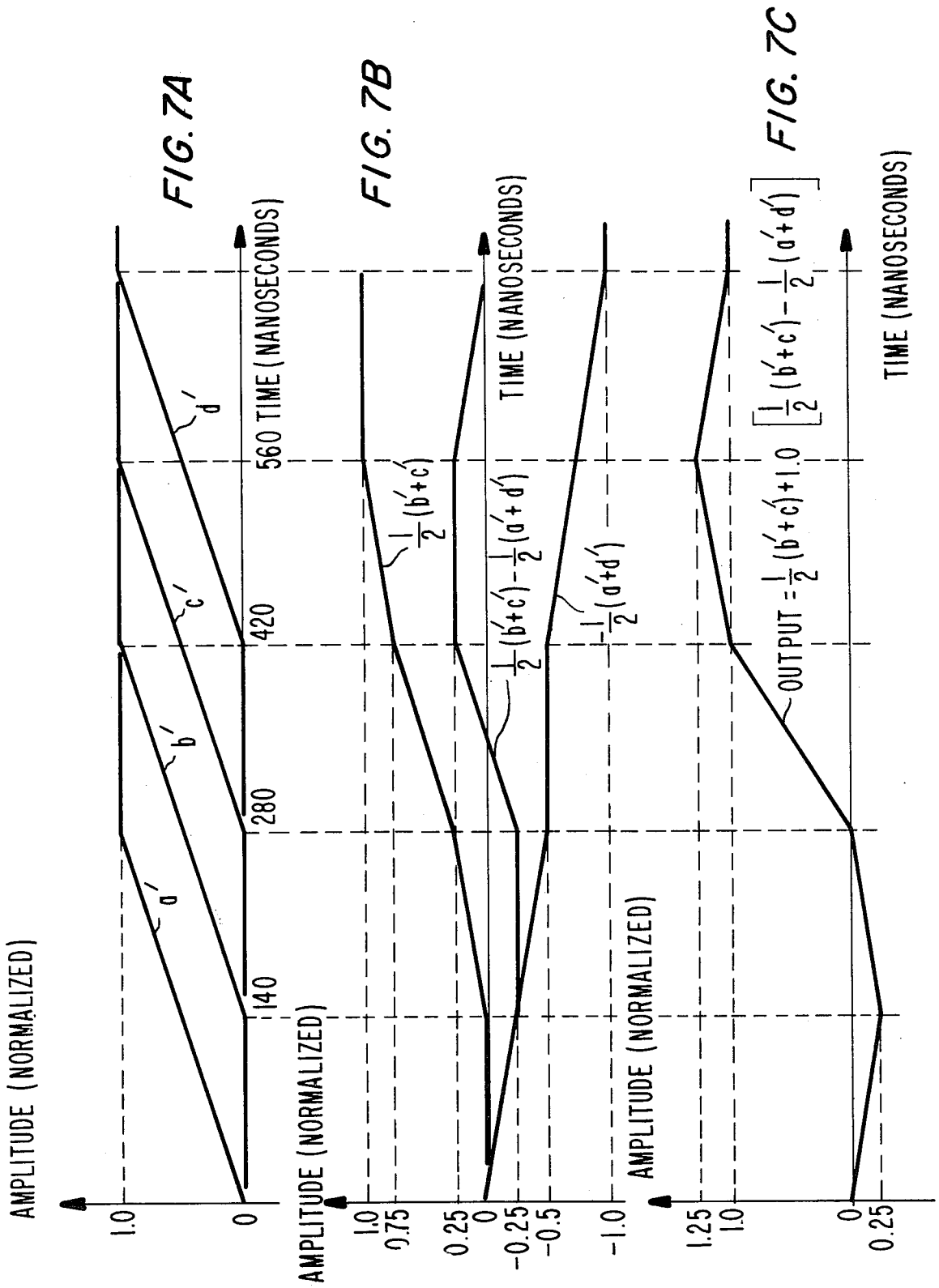
FIGS. 7A, 7B and 7C are graphical representations of time domain waveforms useful in understanding the operation of the embodiment of the present invention shown in FIG. 5.

Inspection of FIG. 7 will show that the output signal contains an overshoot and a preshoot which are controlled by the amplitude controlled signals associated with taps 38a' and 38d'. The amplitudes of the preshoot and overshoot are controlled by the selection of the predetermined values A' and D' while the time durations of the preshoot and overshoot are controlled by the selection of the time intervals $T_1'$ and $T_3'$. It should be noted that the steepness of the output signal is greater than the steepness of the input video signal. Furthermore, adjusting the gain setting of the peaking control circuit 416 affects both the steepness and the amplitude of the preshoot and overshoot of the output signals.

Thus, by algebraically combining amplitude controlled signals in a predetermined manner, the peaking circuit of FIG. 5 provides for amplitude transitions being relatively steep and having a controlled preshoot and overshoot which serve to accentuate the amplitude transition.

It should be noted that the phase versus frequency characteristics of the signal processing unit of FIG. 5 may be readily controlled by controlling the amplitude controlled signals associated with taps 38a' and 38d'. For instance, a linear phase versus frequency characteristic corresponds to the formation of equal preshoots and overshoots. Therefore, although the predetermined values A' and D' were chosen to be equal and time delay intervals $T_1'$ and $T_3'$ were chosen to be equal in the above described example to produce a linear phase versus frequency characteristic as manifested by equal preshoots and overshoots, the amplitude controlled signals associated with taps 38a' and 38d' may be controlled to produce unequal preshoots and overshoots to compensate for phase versus frequency non-linearities in other portions of the video signal processing system.

Figure 8:
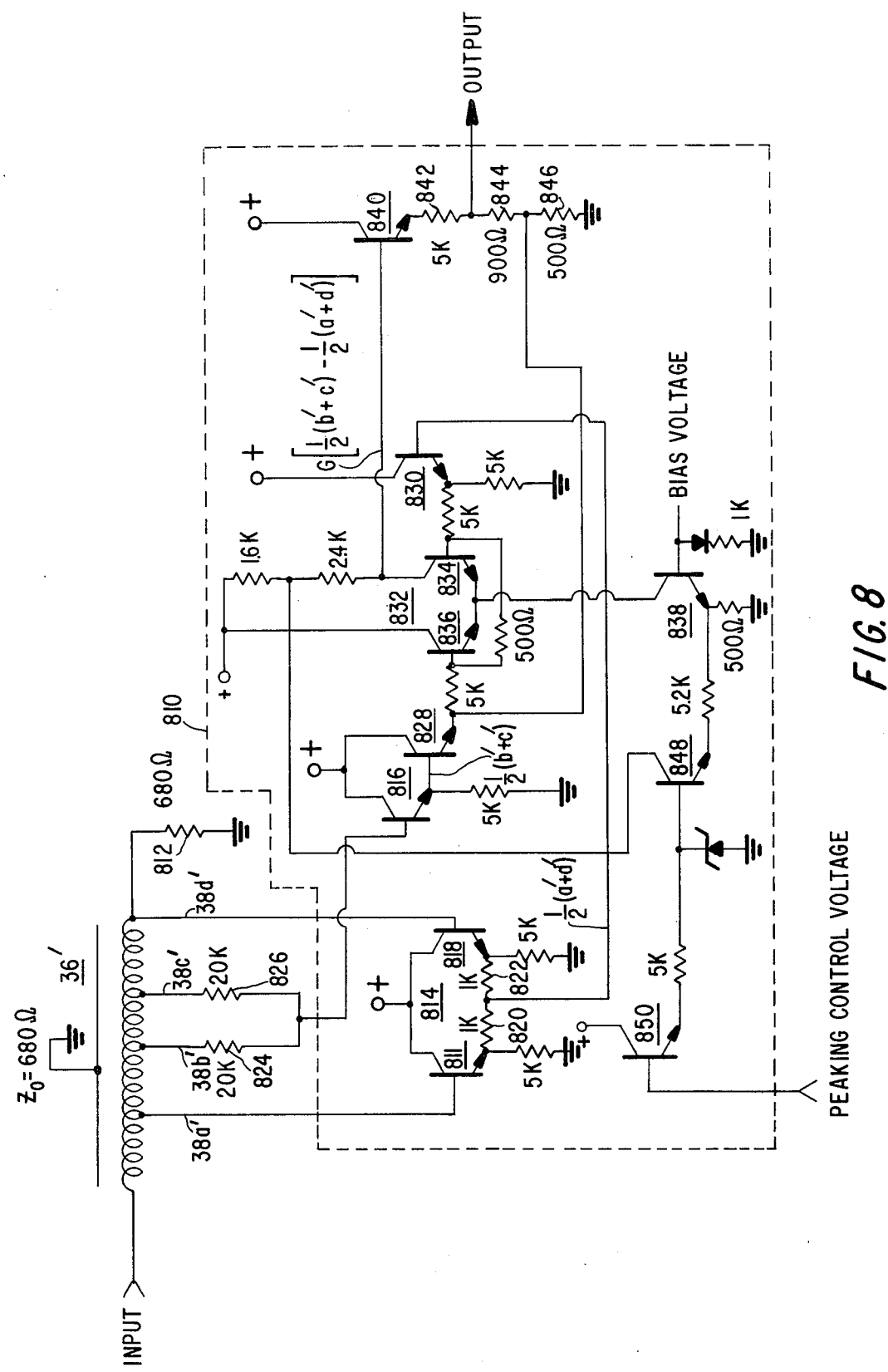
FIG. 8 is a schematic diagram of a circuit implementation of the embodiment of the present invention shown in block diagram form in FIG. 5.

In FIG. 8, there is shown an implementation of the embodiment of the invention shown in block diagram form in FIG. 5, a substantial portion (included within dotted lines 810) of which is suitable for construction as an integrated circuit. The resistance values shown in FIG. 8 are selected, by way of example, to produce predetermined values of $A'=\frac{1}{2}$, $B'=\frac{1}{2}$, $C'=\frac{1}{2}$ and $D'=\frac{1}{2}$, consistent with the example used in the description of the operation of the circuit of FIG. 5. It should be appreciated that the circuit of FIG. 8 may be modified to produce other predetermined values and to otherwise accomodate a particular application.

In FIG. 8, delay line 36' is selected to serve to equalize the time delays of signals processed in chrominance channel 14 and luminance channel 18 of FIG. 1 in addition to delaying the input video signal between successive taps 38a', 38b', 38c' and 38d' by predetermined intervals. The source of video signals (not shown) typically has an output impedance approximately equal to the characteristic impedance of delay line 36' to minimize signal reflections at the input terminal of delay line 36'. Delay line 36' is terminated in impedance 812 whose value is selected approximately equal to the value of the characteristic impedance of delay line 36' to minimize end-of-the-line reflections.

Taps 38a' and 38d' are respectively coupled to the two inputs of differential amplifier 814, comprising NPN transistors 811 and 818, where the delayed video signals respectively established at taps 38a' and 38d' are weighted and arithmetically added to generate a signal at the junction of resistors 820 and 822 of differential amplifier 814 equal to $\frac{1}{2}(a'+d')$. The input impedance of differential amplifier 814 is made relatively high compared to the value of the characteristic impedance of delay line 36' by suitable selection of the values of the emitter resistors of transistors 311 and 818.

Taps 38b' and 38c' are respectively coupled through resistors 824 and 826 to the base of transistor 816, having a common emitter configuration and forming together with resistors 824 and 826 a summing circuit. Resistors 824 and 826 are selected to have relatively high values compared to the value of the characteristic impedance of delay line 36' so as not to load delay line 36'. The signal at the emitter of transistor 816 is equal to $\frac{1}{2}(b'+c')$.

It should be noted that the $\frac{1}{2}(b'+c')$ signal may be generated in the same manner as the $\frac{1}{2}(a'+d')$ signal, but is illustrated as being generated in the summing circuit comprising transistor 816 and resistors 824 and 826 to conserve integrated circuit input terminals.

The $\frac{1}{2}(b'+c')$ and $\frac{1}{2}(a'+d')$ signals are respectively coupled through emitter follower stages respectively comprising NPN transistors 828 and 830 to the inputs of differential amplifier 832. Differential amplifier 832 comprises NPN transistors 836 and 834, where the $\frac{1}{2}(a'+d')$ signal is subtracted from the $\frac{1}{2}(b'+c')$ signal to thereby generate a signal equal to $G[\frac{1}{2}(b'+c') - \frac{1}{2}(a'+d')]$ at the collector of transistor 834, where G is the gain of differential amplifier 832.

The gain G of differential amplifier 832 may be adjusted by adjusting the voltage at the peaking control terminal of the peaking control circuit comprising NPN transistors 838, 848, and 850. This adjustment corresponds to setting the gain of peaking control circuit 416 of FIG. 5. The peaking control circuit is coupled to the emitter and collector circuits of transistor 834 in a manner such that the gain of differential amplifier 832 may be adjusted without substantially varying the DC voltage at the output of differential amplifier 832 in response to the peaking control voltage. That is, the current supplied to the emitter circuit of transistor 834 from the collector of transistor 836 and the current supplied to the collector circuit of transistor 834 from the collector of transistor 848 are proportioned to vary the DC component of the output signal of differential amplifier 832 in a substantially equal and opposite sense in response to variations of the peaking control voltage.

The output of differential amplifier 832 is coupled to the base of NPN transistor 840, comprising, together with the series connection of resistors 842, 844 and 846, an emitter-follower circuit. The $\frac{1}{2}(b'+c')$ signal, established at the emitter of NPN transistor 828, is coupled to the junction of resistors 844 and 846 where it is algebraically added to the $G[\frac{1}{2}(b'+c') - \frac{1}{2}(a'+d')]$ signal to form the output signal.

Referring now to FIG. 9, there is shown an embodiment of the invention, similar to the embodiment of FIG. 5, having a simplified structure made possible by utilizing reflected signals when a delay line 36" is suitably terminated (shown as an open circuit) to generate reflected signals. Tap 912 is located at a position corresponding to a time delay interval of $(T_1''+T_2''+T_3'')/2$, where $T_1''$, $T_2''$ and $T_3''$ correspond to the time delay intervals $T_1'$, $T_2'$, and $T_3'$ of FIG. 5, from the open end of the delay line and develops signals similar to the signal resulting from summing the signals developed at taps 38a' and 38d' of FIG. 5. Tap location 914 is located at a position corresponding to a time delay $T_2''/2$ from the open end of delay line 36" and develops a signal similar to the signal resulting from summing the signals developed at taps 38b' and 38c' of FIG. 5. Thus, if $T_1''$, $T_2''$ and $T_3''$ were chosen equal to T/2, where T corresponds to the period of an undesirable signal, tap 912 would be located at a time interval 3T/4 from the open end of the delay line and tap 914 would be located at a time interval T/4 from the open end of the delay line. Thus a direct $a''$ signal and a reflected $d''$ signal, delayed from the $a''$ signal by a delay time interval equal to $T_1''+T_2''+T_3''$, are developed at tap 912 to form a resultant signal labelled $a''+d''$. Similarly, a direct $b''$ signal and a reflected $c''$ signal, delayed from the $b''$ signal by a delay time interval equal to $T_2''$, are developed at tap 914 to form a resultant signal labelled $b''+c''$.

The $a''+d''$ signal is coupled to weighting means 916. The $b''+c''$ signal is coupled to weighting means 918. The output signal of weighting means 916 is subtracted from the output of weighting means 918 in summing means 920. The output signal of summing means 920 is coupled through peaking control circuit 922 to summing means 924 where it is added to the output signal of weigthing means 918 to produce the output signal.

It should be noted that whereas in FIG. 5 the amplitudes of the amplitude controlled signals corresponding to tap locations 38a', 38b', 38c∝ and 38d' may be separately controlled by setting the respective predetermined values of weighting means 40a', 40b', 40c' and 40d', the amplitudes of the amplitude controlled signals generated from the direct and reflected signals established at taps 912 and 914 are controlled in pairs. That is, weighting means 916 controls the amplitudes of both amplitude controlled signals generated from the direct and reflected signals developed at tap 912 and weighting means 918 controls the amplitude of both amplitude controlled signals generated from the direct and reflected signals developed at tap 914.

It should be further noted that, as in FIG. 8, the delay line forming delay means 36" desirably includes a portion for equalizing the time delays of the signals processed in the chrominance and luminance channels. For this purpose overall length of the delay line should equal the time delay differential between the signals processed in the chrominance and luminance channel.

Figure 10:
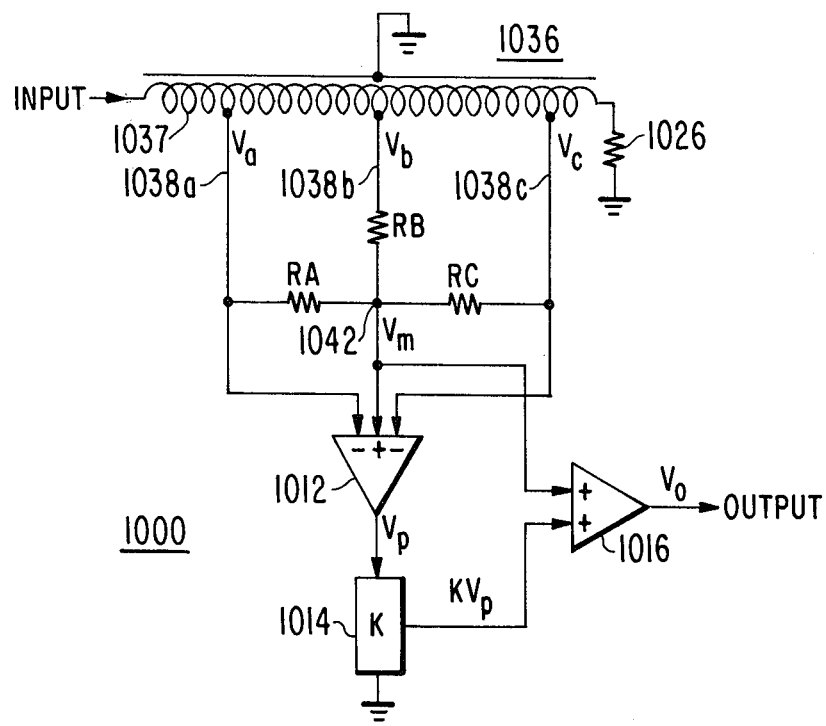
FIG. 10 is a block diagram of still another embodiment of the present invention.

Referring to FIG. 10, a signal processing unit 1000, suitable for use as signal processing unit 20 of FIG. 1, serves to relatively accentuate high frequency components of luminance signal portions while relatively attenuating undesirable portions of the video signal in a similar fashion to the signal processing unit shown in FIG. 2. In addition, signal processing unit 1000 provides depeaking as well as peaking relatively high frequency components of the luminance signal.

Three taps 1038a, 1038b and 1038c are coupled to delay line 1036 at spaced intervals respectively corresponding to delay time intervals D, D+D1, and D+D1+D2 to develop respectively delayed signals $V_a$, $V_b$ and $v_c$ with respect to the input signal. These delay time intervals are similar to $T_D$, $T_D+T_1$ and $T_D+T_1+T_2$, respectively, of the signal processing unit of FIG. 2. Delay line 1036 includes a portion 1037, prior to tap 1038a, similar to portion 37 of the signal processing unit of FIG. 2, for equalizing the time delays of the signals processed in the luminance and chrominance channels.

Delay line 1036 is terminated in an impedance 1026, shown as a resistor, approximately equal in value to the characteristic impedance of delay line 1036. The source of video signals (not shown) should desirably have an output impedance whose value approximately equals the value of the characteristic impedance of delay line 1036.

Portions of delayed signals $v_a$, $v_b$ and $v_c$ are coupled to a common junction point 1042 through resistors RA, RB and RC, respectively, to form a signal $v_m$.

Delayed signals $v_a$, $v_m$ and $v_c$ are respectively coupled to the "−", "+", "−" inputs of summing means 1012 which is similar to summing means 212 of FIG. 2 and serves to algebraically subtract delayed signal $v_a$ and $v_c$ from $v_m$ to form $v_p$. In addition, summing means 1012 may serve to modify the amplitudes (i.e., weights) of $v_a$ and $v_c$ prior to subtraction from $v_m$.

The output of summing means 1012, $v_p$, is coupled to an amplitude control circuit 1014 having a gain K to form $Kv_p$. Amplitude control circuit 1014 may, for example, be a variable gain amplifier arranged to produce a range of gains extending from less than unity to greater than unity.

The output of amplitude control device 1014 and junction 1042 are coupled to the "+" inputs of summing means 1016, similar to summing means 216 of FIG. 2, where $v_m$ and $Kv_p$ are algebraically added to form an output signal $v_o$.

The operation of signal processing unit 1000 will be explained where delay intervals D1 and D2 are each chosen equal to $t$ and summing means 1012 is arranged to modify the amplitudes of $v_a$, $v_m$ and $v_c$ by respective predetermined weights of ½, 1, and ½. Further by way of example, the value of RA is chosen equal to the value of RC. Assuming the values of RA and RB are much larger than the value of the characteristic impedance of delay line 1036, by applying superposition, the relations of $v_m$ to $v_a$, $v_b$ and $v_c$ is given by the expression:

$$v_m = \frac{1}{2}\left(\frac{2RB}{RA + 2RB}\right)(v_a + v_c) + \left(\frac{RA}{RA + 2RB}\right)v_b \quad [1]$$

The signals $v_p$ and $v_o$ are given by the expressions:

$$v_p = v_m - [\tfrac{1}{2}(v_a+v_c)] \quad [2]$$
$$v_o = v_m + Kv_p = v_m + K[v_m - \tfrac{1}{2}(v_a+v_c)] \quad [3]$$

Considering tap 1038b to be located at a reference point as defined earlier, the amplitude versus frequency transfer characteristics associated respectively with $v_m$, $v_p$ and $v_o$ are given by the expressions:

$$\frac{2RB}{RA + 2RB}\cos\omega t + \frac{RA}{RA + 2RB} \quad [4]$$

$$\frac{2RB}{RA + 2RB}\cos\omega t + \frac{RA}{RA + 2RB} - \cos\omega t \quad [5]$$

$$\frac{2RB}{RA + 2RB}\cos\omega t + \frac{RA}{RA + 2RB} +$$

$$K\left(\frac{2KB}{RA + 2RB}\cos\omega t + \frac{RA}{RA + 2RB} - \cos\omega t\right) \quad [6]$$

Figure 11:
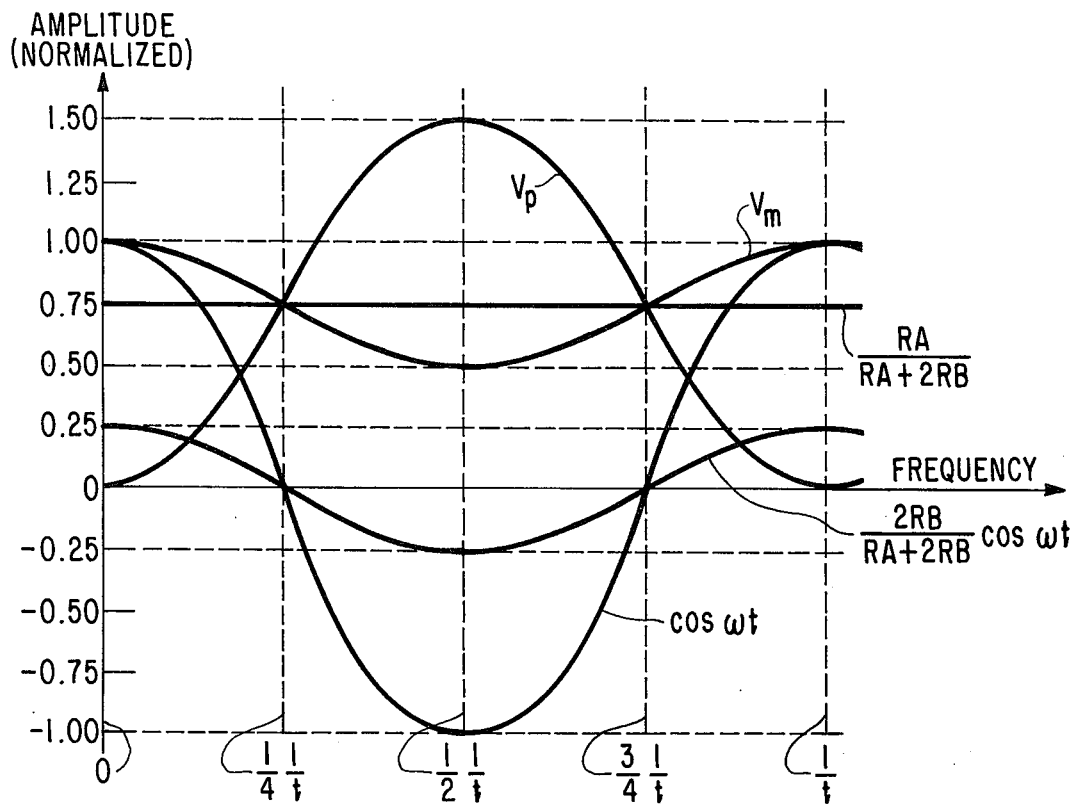
FIGS. 11 and 12 are graphical representations of frequency domain waveforms useful in understanding the operation of the embodiment shown in FIG. 10.

Referring now to FIG. 11, there is shown graphical representations of normalized amplitude versus frequency transfer characteristics associated with $v_m$ and $v_p$. The transfer characteristic associated with $v_m$ is a cosine function having a peak to peak amplitude of 2 2RB/(RA+RB), a periodicity of 1/t superimposed on a level RA/(RA+2RB) (see expression [4]), a maximum amplitude (equal to 1) at DC (i.e., zero frequency) and at integral multiples of 1/t, and a minimum amplitude at integral multiples of 1/2t.

It is desirable to choose the values of resistors RA, RB and RC such that the transfer characteristic associated with $v_m$ does not fall below the 0 amplitude axis (i.e., become negative) since this corresponds to an undesirable phase reversal. In the example, this corresponds to choosing RA/(RA+2RB) greater than or equal to 2RB/(RA+2RB), or, rather, RA should be greater than or equal to 2RB. For the purposes of the example RA/(RA+2RB) was chosen equal to 0.75 and 2RB/(RA+2RB) was chosen equal to 0.25.

Independent of the selection of RA, RB and RC, the transfer characteristic associated with $v_m$ at DC is always 1 since at DC the delay signals at taps 1038a, 1038b and 1038c will all have the same amplitudes. This is desirable since, as will be seen, it allows for controllable depeaking or peaking of relatively high frequency components of the luminance signal without affecting the DC component of the luminance signal.

The transfer characteristic associated with $v_p$ (expression [5]) is a cosine function having minimum (zero) amplitude at DC and integral multiples of 1/t, a periodicity of 1/t, and a maximum amplitude at integral multiples of 1/2t. The maximum amplitude points of the transfer characteristic associated with $v_p$ are opposite the minimum amplitude points of the transfer characteristic associated with $v_m$ and vice versa.

Since $v_o$ is the algebraic sum of $v_m$ and $Kv_p$ (see expression [3]), the transfer characteristic associated with $v_o$ a integral multiples of 1/2t may be relatively accentuated (peaked) or relatively attenuated (depeaked) by controlling the value of K without affecting the amplitude either at DC or at integral multiples of 1/t. That is, by varying K the transfer characteristic associated with $v_o$ at a frequency 1/2t may be greater (i.e., peaked) or less (i.e., depeaked) than the transfer characteristic associated with $v_b$ at that frequency. It should be noted that the transfer characteristic associated with $v_b$ corresponds to the relatively broadband transfer characteristic associated with the signal developed at tap 38b of the signal processing unit of FIG. 2 (i.e., level 312 of FIG. 3).

Figure 12:
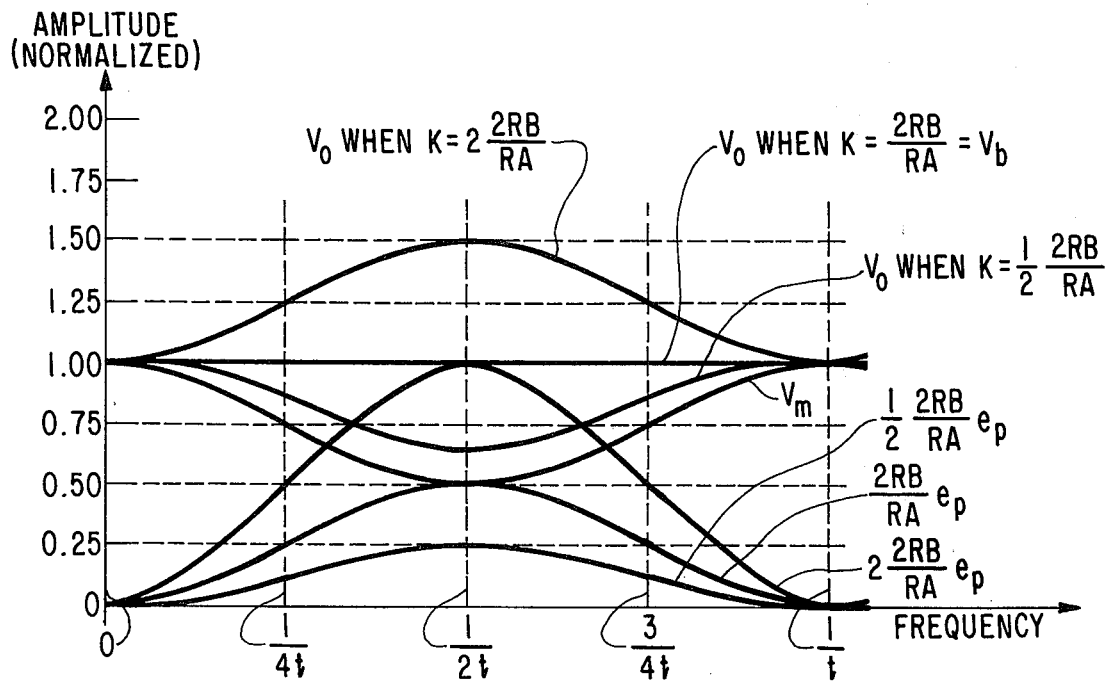

The variation of the transfer characteristic associated with $v_o$ as a function of K is demonstrated in FIG. 12 which is a graphical representation of normalized amplitude versus frequency transfer characteristics associated with $v_m$, $v_p$ and $v_o$ for several values of K. When K equals 2RB/RA the transfer characteristic associated with $v_o$ is flat, i.e. equals the transfer characteristic associated with $v_b$. When K is less than 2RB/RA, e.g., ½(2RB/RA), the transfer characteristic associated with $v_o$ is depeaked at 1/2t. When K is greater than 2RB/RA, e.g., 2 2RB/RA, the transfer characteristic associated with $v_o$ is peaked at $1/2t$.

By selecting D1 and D2 of signal processing unit 1000 equal to approximately 280 nanoseconds, the amplitude of the amplitude versus frequency transfer characteristic of the luminance channel 18 of FIG. 1 at approximately 1.78 MHz may be varied from a peaked condition to a depeaked condition by varying the gain, K, of amplitude control circuit 1014.

When signal processing unit 1000 is utilized in luminance channel 18 of FIG. 1, an additional filter circuit, either before or after signal processing unit 1000 may be intended to further attenuate chrominance or sound signal portions or both.

Figure 13:
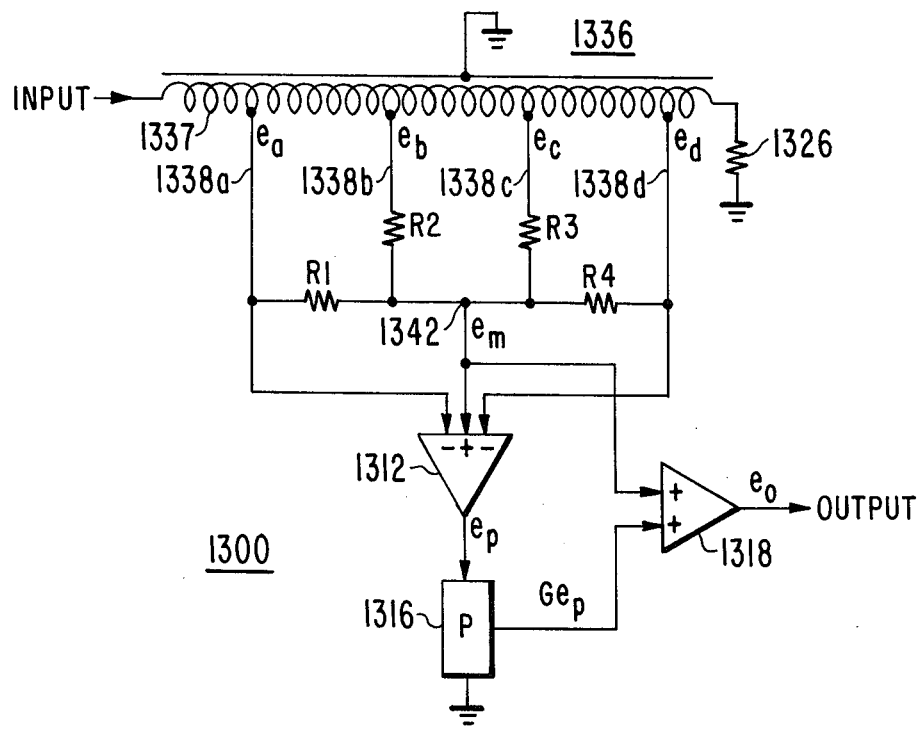
FIG. 13 is a block diagram of still another embodiment of the present invention.

Referring to FIG. 13, there is shown a further signal processing unit 1300 suitable for use as signal processing unit 20 of FIG. 1.

Four taps, 1338a, 1338b, 1338c and 1338d, are coupled to delay line 1336 at spaced intervals respectively corresponding to delay time intervals, D', D'+D1', D'+D1' +D2', and D'+D1'+D2'+D3', to develop respectively delayed signals $e_a$, $e_b$, $e_c$ and $e_d$ with respect to the input signal. These delay time intervals are similar to $T_D'$, $T_D'+T_1'$, $T_D'+T_1'+T_2'$, and $T_D'+T_1'+T_3'$, respectively, of the signal processing unit of FIG. 5. Delay line 1336 includes a portion 1337, prior to tap 1338a, similar to portion 37' of the signal processing unit of FIG. 5, for equalizing the time delays of the signals processed in the luminance and chrominance channels.

Delay line 1336, is terminated in an impedance 1326, shown as a resistor, approximately equal in value to the characteristic impedance of delay line 1336 to minimize reflections from the end of the line. Similarly, the source of video signals (not shown) should desirably have an output impedance whose value approximately equals the value of the characteristics impedance of delay line 1336 to minimize signal reflections at the input.

Portions of delayed signals $e_a$, $e_b$, $e_c$ and $e_d$ are coupled to a common junction point 1342 through resistors R1, R2, R3 and R4, respectively, to form $e_m$.

The signals $e_a$, $e_m$ and $e_d$ are respectively coupled to the "−", "+", "−" inputs of a summing means 1312, which serves to form a signal $e_p$. In addition, summing means 1312 may serve to modify the amplitudes (i.e., weights) of $e_a$ and $e_d$ prior to subtraction from $e_m$.

The output of summing means 1312 is coupled to an amplitude control circuit 1316 which serves to modify the amplitude of $e_p$ by a gain, P, to form P$e_p$. Amplitude control circuit 1316 is arranged, for example, to produce a range of gains extending from less than unity to greater than unity.

The output of amplitude control device 1316 and the signals at junction 1342 are coupled to the "+" inputs of summing means 1318 similar to summing means 216 of the signal processing unit of FIG. 2, where $e_m$ and P$e_p$ are algebraically added to form output signal $e_o$.

Resistors may be connected in series with the inputs of summing means 1312 and 1318 to compensate for variations of the respective time delays of the signals combined in these circuits due to the non-uniformity of the parasitic capacitances associated with the inputs to these circuits.

The operation of signal processing unit 1300 will be explained by way of an example wherein delay time intervals D1', D2' and D3' are each chosen to equal to 2t' and summing means 1312 is chosen to modify the amplitudes of $e_a$, $e_m$ and $e_d$ by predetermined weights of 178, 1, and ½ respectively. Further by way of example, the value of R1 is chosen equal to the value of R4 and the value of R2 is chosen equal to the value of R3. Assuming the values of R1 and R2 are much larger than the value of the characteristic impedance of the delay line 1336, by applying superposition, the relation of $e_m$ to $e_a$, $e_b$, and $e_d$ is given by the expression:

$$e_m = \frac{1}{2}\left(\frac{R2}{R1+R2}\right)(e_a + e_d) + \frac{1}{2}\left(\frac{R1}{R1+R2}\right)(e_b + e_c) \quad [7]$$

The signals $e_p$ and $e_o$ are given by the expressions:

$$e_p = e_m - \tfrac{1}{2}(e_a+e_d) \quad [8]$$
$$e_o = e_m + Pe_p = e_m + P[e_m - \tfrac{1}{2}(e_a+e_d)] \quad [9]$$

Considering a point midway between taps 1338b and 1338c to be a reference point, the amplitude versus frequency transfer characteristics associated respectively with $e_m$, $e_p$ and $e_o$ are given by the expressions:

$$\frac{R2}{R1+R2}\cos3\omega t' + \frac{R1}{R1+R2}\cos 107\ t' \quad [10]$$

$$\frac{R2}{R1+R2}\cos3\omega t' + \frac{R1}{R1+R2}\cos\omega t' - \cos3\omega t' \quad [11]$$

$$\frac{R2}{R1+R2}\cos3\omega t' + \frac{R1}{R1+R2}\cos\omega t' +$$
$$P\left(\frac{R2}{R1+R2}\cos\omega t' + \frac{R1}{R1+R2}\cos\omega t - \cos3\omega t'\right) \quad [12]$$

Figure 14:
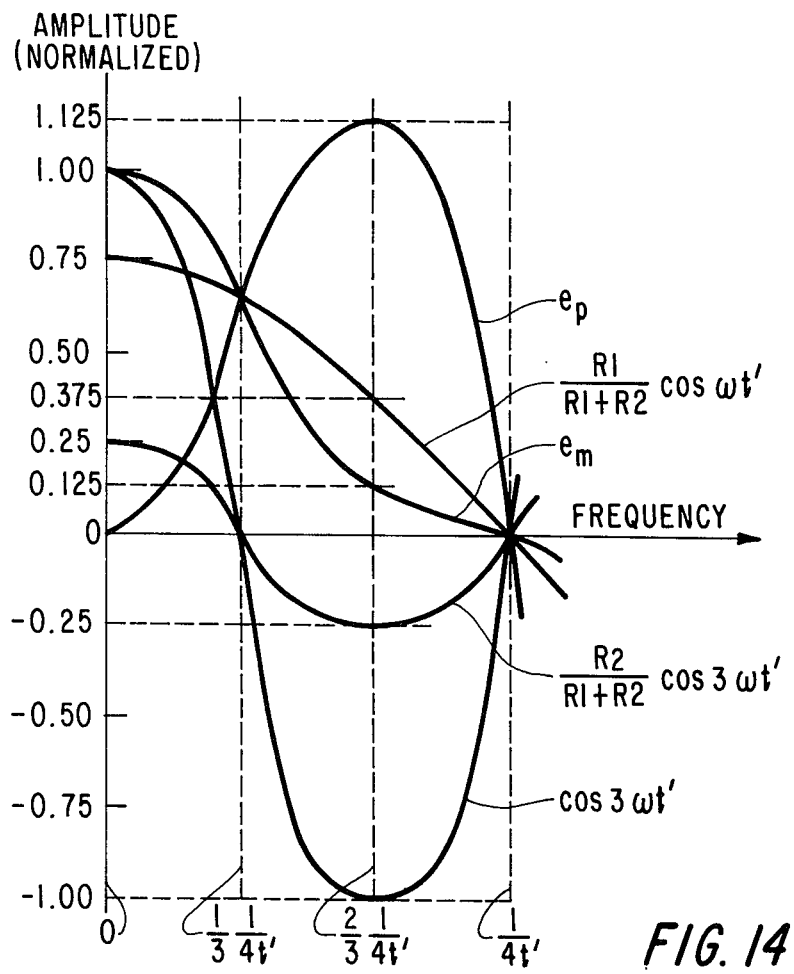
FIGS. 14 and 15 are graphical representations of frequency domain waveforms useful in understanding the operation of the embodiment shown in FIG. 13.

Referring to FIG. 14, there is shown graphical representations of normalized amplitude versus frequency transfer characteristics associated with $e_m$ and $e_p$. It is noted that the amplitude versus frequency transfer characteristic associated with $e_m$ has the form of a cosine function (R2/R1+R2) cos$\omega t'$ superimposed on another cosine function (R1/R1+R2) cos$3\omega t'$. The transfer characteristic associated with $e_m$ has a maximum amplitude equal to 1 at DC (i.e., zero frequency) and decreases in amplitude with a relatively steep roll-off (i.e., decreasing amplitude with increasing frequency) after approximately (½)¼t, to an amplitude of 0 at ¼t'. A comparison between the relatively broadband characteristic labeled ½(b' +c') of FIG. 6, corresponding to the signal developed at the output of summing means 412 of the signal processing unit of FIG. 5, and the transfer characteristic associated with $e_m$ of FIG. 14 indicates that the latter transfer characteristic rolls off more rapidly than does the former.

It is desirable to choose the values of resistors R1, R2, R3 and R4 such that the transfer characteristic associated with $e_m$ does not fall below the 0 amplitude axis (i.e., becomes negative) since this corresponds to undesirable phase reversal. In the example, this result corresponds to choosing ½(R1/R1+R2) greater than or equal to (R2/R1+R2, or, rather, R1 should be greater than or equal to 2(R2). For the purpose of the example, (R1/R1+R2) was chosen equal to 0.75 and (R2/R1+R2) was chosen equal to 0.25.

It should be noted that independent of the selection of R1, R2, R3 and R4, the value of the amplitude versus frequency transfer characteristic associated with $e_m$ at DC is 1 since, at DC, the delayed signals at taps 1338a, 1338b, 1338c and 1338d all have the same amplitude. This is significant since, as will be seen, it allows for controllable depeaking or peaking of relatively high frequency components of the luminance signal without affecting the DC component of the luminance signal.

The transfer characteristic associated with $e_p$, derived in accordance with expression [11], has a minimum amplitude (equal to 0) at DC and at $\frac{1}{2}t'$, and a maximum amplitude at approximately $(\frac{2}{3})\frac{1}{2}t'$. Thus, the peak amplitude point of the transfer characteristic associated with $e_p$ is located in the relatively steep roll-off region between $(\frac{1}{3})\frac{1}{2}t$ and $\frac{1}{2}t'$ of the transfer characteristic associated with $e_m$.

Figure 15:
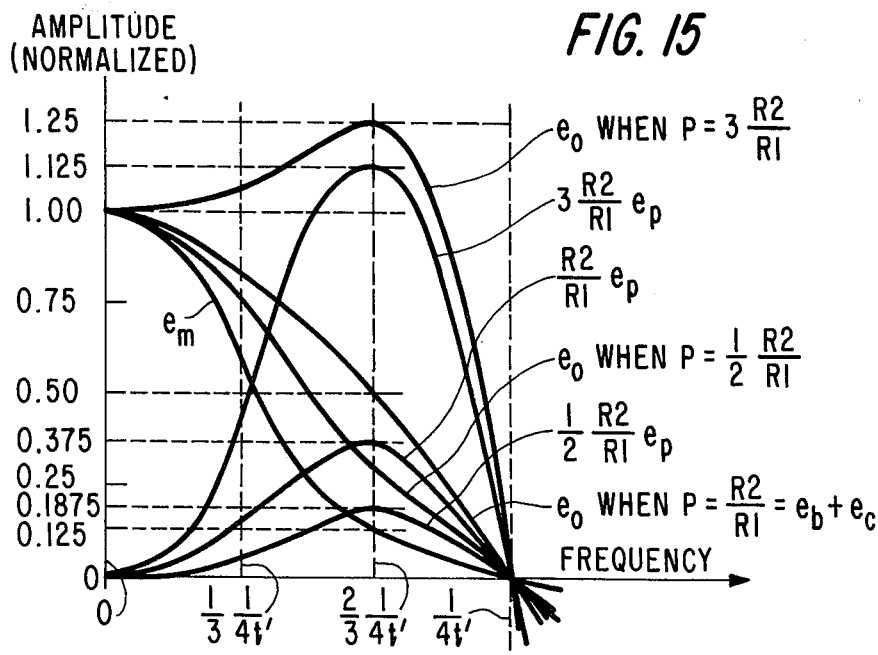

Since $e_o$ is the algebraic sum of $e_m$ and $Pe_p$ (see expression [9]), the amplitude of the transfer characteristic associated with $e_o$ at $(\frac{2}{3})\frac{1}{2}t'$ may be relatively accentuated (peaked) or relatively attenuated (depeaked) by controlling the value of P without affecting the amplitude at DC or at $\frac{1}{2}t'$. That is, by varying P the amplitude of the amplitude versus frequency transfer characteristic associated with $e_o$ at a frequency $(\frac{2}{3})\frac{1}{2}t'$ may be controlled by be greater (i.e., peaked) or less (i.e., depeaked) that the amplitude of the transfer characteristic associated with the signal $(e_b+e_c)$ of FIG. 6 at the frequency $(\frac{2}{3})\frac{1}{2}t$. It should be noted that the transfer characteristic associated with $(e_b+e_c)$ corresponds to the relatively broadband transfer characteristic associated with the signal developed at the output of summing means 412 of the signal processing unit of FIG. 5, i.e., waveform $\frac{1}{2}(b' +c')$ of FIG. 6. The variation of the transfer characteristic associated with $v_o$ as a function of K is demonstrated in FIG. 15 which is a graphical representation of normalized amplitude versus frequency transfer characteristics associated with $e_m$ and $e_p$ and $e_o$ for several values of P. When P equals R2/R1 the transfer characteristic associated with $e_o$ equals the transfer characteristic associated with $e_b+e_c$. When P is less than R2/R1, e.g., $(\frac{1}{2})$R2/R1, the transfer characteristic associated with $e_o$ is depeaked at $(\frac{2}{3})\frac{1}{2}t'$. When P is greater than R2/R1, e.g., (3)R2/R1, the transfer characteristic associated with $e_o$ is peaked.

By selecting D1', D2' and D3' of signal processing unit 1300 equal to approximately 140 nanoseconds, the amplitude of the amplitude versus frequency transfer characteristic of the luminance channel 18 of FIG. 1 at approximately 2.39 MHz may be varied from a peaked condition to a depeaked condition by varying the gain P of amplitude control circuit 1316 without varying the amplitude at DC and while effectively attenuating signal components in the vicinity of 3.58 MHz, i.e., chrominance signal components.

In summary, apparatus has been described for relatively increasing the amplitudes of high frequency components of the luminance signal portions while relatively attenuating the amplitudes of chrominance or sound signal portions or both. The apparatus includes a delay line responsive to television video signals. A plurality of taps are associated with the delay line to generate a plurality of delayed video signals. Two delayed video signals are combined to determine the peaking characteristics of the apparatus so that the apparatus provides an amplitude versus frequency characteristic which has a peak in the frequency range between DC and a frequency $f$, the frequency $f$ being in a range at which it is desired to attenuate the video signals. It should be noted that it is desirable to space the two delayed video signals apart in time by a time interval equal to NT/2, where N is an integer and T is the reciprocal of the frequency $f$. With reference to the apparatus of FIG. 2, for example, N was chosen as 4. With reference to the apparatus of FIG. 5, for example, N was chosen as 3. Although the preferred range of N includes integers of the order of 2 to 5, other values of N may be useful in particular applications. A bandwidth controlling or broadband signal is derived from at least a third one of the delayed video signals. The bandwidth controlling signal is combined with the two delayed video signals selected to control the peaking characteristics of the apparatus to form an output signal. With reference to the apparatus of FIG. 2, for example, the broadband signal is derived from the delayed video signal developed at the center tap 38b. With reference to the apparatus of FIG. 5, for example, the broadband signal is derived from the combination of the delayed video signals developed at the center two taps 38b' and 38c'.

It was also shown that the apparatus produced an improved transient response consistent with the attenuation of undesirable signals which would, without their attenuation, normally produce undesirable visible patterns. It was also shown that the apparatus produced readily controllable preshoots and overshoots. It was further shown that the apparatus provided for peaking adjustment which does not substantially affect the amplitudes of the DC components or the amplitudes of frequency components around the frequency $f$.

Apparatus have also been described which provide control of the peaked amplitude portion to allow either peaking or depeaking depending on the quality of the transmitted signal. These apparatus include arrangements for reducing the amplitude of the output signal below the amplitude of the broadband signal at a frequency approximately equal to the frequency at which the peaking control signal has a maximum amplitude. For example, in signal processing unit 1000 of FIG. 10, portions of two delayed signals separated by a delay time of 2T are added to a portion of a relatively broadband signal derived from a signal having an average delay intermediate the two delayed signals to allow the amplitude of the output signal to be adjusted to a value above (i.e., peaked) and below (i.e., depeaked) the amplitude of the broadband signal at a frequency of $\frac{1}{2}T$. In signal processing unit 1300 of FIG. 13, portions of two delayed signals separated by a delay time of 3T/2 are added to a portion of a relatively broadband signal derived by the algebraic addition of two delayed signals each having delays intermediate the delays of the two delayed signals separated by a delay of 2T to allow the amplitude of the output signal to be adjusted to a value above (i.e., peaked) and below (i.e., depeaked) the broadband signal at a frequency of $(\frac{2}{3})\frac{1}{2}t$.

Further, a portion of the delay line can be utilized for equalizing the time delay differentials of the signals processed in the chrominance and luminance channels.

It should be appreciated that although the invention has been described with reference to particular embodiments, various additional modifications may be made within the scope of the invention.

What is claimed is:

1. In a color television receiver including a source of composite video signals, said composite video signals including a luminance component occupying a wide band of frequencies and a chrominance component occupying a portion of said wide band of frequencies, said chrominance component comprising modulated color subcarrier waves; apparatus for processing said composite video signals, comprising:

a chrominance channel coupled to said source of composite video signals and including means responsive to said modulated subcarrier waves for deriving therefrom a plurality of color difference signals with an effective delay of a given magnitude;

a luminance channel including:

1. a delay line coupled to said source of composite video signals, said delay line having a plurality of terminals for providing a plurality of delayed video signals, said plurality of delayed video signals being delayed by different amounts;
2. first means providing a first combined signal comprising the sum of two of said delayed video signals which differ in delay by a time interval substantially equal to NT/2, where T is a period at the frequency of the color subcarrier of said composite video signals, and N is an integer greater than one;
3. means for deriving a broadband signal from at least one other of said delayed video signals, said broadband signal having an average delay between the delays of the signals comprising said first combined signal and of a delay magnitude substantially corresponding to said given magnitude of delay;
4. second means for combining said broadband signal with said first combined signal to produce a second combined signal having first and second amplitude transition portions of a black-going direction and a white-going direction, respectively;
5. means for adjusting the amplitude of said second combined signal to produce a resultant signal of the form of said second combined signal; and
6. third means for combining said broadband signal with said resultant signal to produce an output signal having controllably accentuated black-going and white-going amplitude transition portions as determined by said first and second amplitude transition portions of said second combined signal; and means for combining said output signal with each of said plurality of color difference signals to form a plurality of color signals.

2. The apparatus recited in claim 1 wherein said portion of said delaying means for equalizing time delays of said luminance and chrominance signals is selected so that the sum of the time delay of said portion and one-half said time interval NT/2 equals the difference between the time delays of said chrominance and luminance signal portions.

3. The apparatus recited in claim 1 wherein said means for deriving said broadband signal and said first combining means include means for weighting the amplitudes of said delayed video signals.

4. The apparatus recited in claim 1 wherein said third combining means provides the sum of said broadband signal and said resultant signal.

5. The apparatus recited in claim 1 wherein said second combining means provides the difference between said broadband signal and said first combined signal.

6. The apparatus recited in claim 5 wherein said third combining means provides the sum of said broadband signal and said resultant signal.

7. The apparatus recited in claim 6 wherein said means for adjusting the amplitude of said second combined signal includes an amplifier having an input and an output, said second combined signal being coupled to said input, and means for coupling a DC control signal to said amplifier for controlling the gain of said amplifier without substantially varying the DC content at said output.

8. The apparatus recited in claim 6 wherein said means for providing said broadband signal derives said broadband signal from a delayed video signal spaced in time approximately midway between said two delayed signals.

9. The apparatus recited in claim 8 wherein said chrominance signal portions are arranged in frequency around a color subcarrier frequency and said two delayed video signals are spaced apart in time from said broadband signal by an interval approximately equal to the reciprocal of said color subcarrier frequency.

10. The apparatus according to claim 1 wherein said black-going and white-going amplitude portions are substantially symmetrical.

11. Apparatus including luminance and chrominance processing means for processing television video signals including luminance and chrominance signals, comprising:

a source of video signals;

signal delaying means coupled to said source of video signals, said signal delaying means having a plurality of terminals for providing delayed video signals, said delayed video signals being delayed by different amounts, and said signal delaying means further including a portion for substantially equalizing time delays of said luminance and chrominance signals respectively processed in said luminance and chrominance signal processing means;

first combining means providing a first combined signal comprising the sum of at least two of said delayed video signals delayed from one another by a time interval substantially equal to NT/2, where T is the period of a signal to be attenuated and N is an integer greater than one;

means for adding portions of said two delayed video signals delayed from one another by a time interval substantially equal to NT/2 to a portion of a delayed video signal delayed in time approximately midway between said two delayed video signals, to derive a broadband signal having an average delay approximately midway between said two delayed video signals;

second combining means for providing the difference between said broadband signal and said first combined signal to produce a second combined signal having first and second amplitude transition portions of a black-going direction and a white-going direction, respectively;

means for adjusting the amplitude of said second combined signal to produce a resultant signal of the form of said second combined signal; and third combining means for summing said broadband signal with said resultant signal to produce an output signal having controllably accentuated black-going and white-going amplitude portions as determined by said first and second amplitude transition portions of said second combined signal.

12. The apparatus recited in claim 11 wherein said means for deriving said broadband signal includes first, second and third direct current coupling means coupled between respective terminals for providing said two delayed video signals delayed from one another by a time interval substantially equal to NT/2 and said delayed video signal delayed in time approximately midway between said two delayed video signals and a common junction point; said broadband signal being developed at said common junction point.

13. The apparatus recited in claim 12 wherein said first, second and third direct current coupling means include first, second and third resistors, respectively.

14. The apparatus recited in claim 13 wherein said first and third resistors are approximately equal in value.

15. The apparatus recited in claim 14 wherein the value of said first resistor is greater than twice the value of said second resistor.

16. Apparatus including luminance and chrominance processing means for processing television video signals including luminance and chrominance signals, comprising:
   a source of video signals;
   signal delaying means coupled to said source of video signals, said signal delaying means having a plurality of terminals for providing delayed video signals, said delayed video signals being delayed by different amounts, and said signal delaying means further including a portion for substantially equalizing time delays of said luminance and chrominance signals respectively processed in said luminance and chrominance signal processing means;
   first combining means providing a first combined signal comprising the sum of at least two of said delayed video signals delayed from one another by a time interval substantially equal to NT/2, where T is the period of a signal to be attenuated and N is an integer greater than one;
   means for adding portions of said two delayed video signals delayed from one another by a time interval substantially equal to NT/2 to a portion of at least one other of said delayed video signals, to derive a broadband signal having an average delay between the delays of the signals comprising said first combined signal;
   second combining means for providing the difference between said broadband signal and said first combined signal to produce a second combined signal having first and second amplitude transition portions of a black-going direction and a white-going direction, respectively;
   means for adjusting the amplitude of said second combined signal to produce a resultant signal of the form of said second combined signal; and
   third combining means for summing said broadband signal with said resultant signal to produce an output signal having controllably accentuated black-going and white-going amplitude portions as determined by said first and second amplitude transition portions of said second combined signal.

17. Apparatus including luminance and chrominance processing means for processing television video signals including luminance and chrominance signals, comprising:
   a source of video signals;
   signal delaying means coupled to said source of video signals, said signal delaying means having a plurality of terminals for providing at least first, second, third and fourth delayed video signals, said delayed video signals being delayed by different amounts, and said signal delaying means further including a portion for substantially equalizing time delays of said luminance and chrominance signals respectively processed in said luminance and chrominance signal processing means;
   said first and fourth delayed video signals being coupled to first means for providing a first combined signal comprising the sum of at least said first and fourth delayed video signals, said first and fourth delayed video signals being delayed from one another by a time interval substantially equal to NT/2, where T is the period of a signal to be attenuated and N is an integer greater than one;
   said second and third delayed video signals being coupled to means for providing a broadband signal from at least said second and third delayed video signals, said broadband signal having an average delay between the delays of the signals comprising said first combined signal;
   second combining means for providing the difference between said broadband signal and said first combined signal to produce a second combined signal having first and second amplitude transition portions of a black-going direction and a white-going direction, respectively;
   means for adjusting the amplitude of said second combined signal to produce a resultant signal of the form of said second combined signal;
   third combining means for summing said broadband signal with said resultant signal to produce an output signal having controllably accentuated black-going and white-going amplitude portions as determined by said first and second amplitude transition portions of said second combined signal; and wherein
   said amplitude adjusting means includes an amplifier having an input and an output, said second combined signal being coupled to said input, and means for coupling a D.C. control signal to said amplifier for controlling the gain of said amplifier without substantially varying the D.C. content at said output.

18. The apparatus recited in claim 17 wherein said second and third delayed video signals are symmetrically spaced in time with respect to a time location midway between said first and fourth delayed video signals.

19. The apparatus recited in claim 18 wherein said first and fourth delayed video signals are coupled to said means for deriving said broadband signal and wherein said means for deriving said broadband signal includes means for adding portions of said first and fourth delay video signals to portions of said second and third delayed video signals.

20. The apparatus recited in claim 19 wherein said means for deriving said broadband signal includes first, second, third and fourth direct current coupling means coupled between respective terminals for providing said first, second, third and fourth delayed video signals and a common junction point; said broadband signal being developed at said common junction point.

21. The apparatus recited in claim 20 wherein said first, second, third and fourth direct current coupling means include first, second, third and fourth resistors, respectfully.

22. The apparatus recited in claim 21 wherein said first and fourth resistors are approximately equal in value and wherein said second and third resistors are approximately equal in value.

23. The apparatus recited in claim 22 wherein the value of said first resistor is greater than twice the value of said second resistor.

24. The apparatus recited in claim 17 wherein said chrominance signal portions are arranged in frequency around a color subcarrier frequency and said second and third signals are spaced apart in time by an interval approximately equal to one-half the reciprocal of the color subcarrier frequency.

25. The apparatus recited in claim 24 wherein said first and second delayed video signals are spaced apart in time by an interval approximately equal to one-half the reciprocal of the color subcarrier frequency and said third and fourth delayed video signals are spaced apart in time by a time interval approximtely equal to one-half the reciprocal of the color subcarrier frequency.

26. The apparatus recited in claim 17 wherein said signal delaying means is a delay line terminated at one end to generate reflected signals; said first and fourth delayed video signals being established at a first terminal coupled to said delay line to receive said reflected signals at a time interval substantially equal to $3T/4$ after said reflected signals are generated; said second and third delayed video signals being established at a second terminal coupled to said delay line to receive said reflected signals at a predetermined time interval less than $3T/4$ after said reflected signals are generated.

27. The apparatus recited in claim 26 wherein said predetermined time interval is substantially equal to $T/4$.

28. The apparatus recited in claim 27 wherein said video signals include chrominance and luminance signal portions, said chrominance signal portions being arranged in frequency around a color subcarrier frequency, and T is substantially equal to the reciprocal of said color subcarrier frequency.

29. In a color television receiver including a source of composite video signals, said composite video signals including a luminance component occupying a wide band of frequencies and a chrominance component occupying a portion of said wide band of frequencies, said chrominance component comprising modulated color subcarrier waves; apparatus for processing said composite video signals, comprising:
   a chrominance channel coupled to said source of composite video signals and including means responsive to said modulated subcarrier waves for deriving therefrom a plurality of color difference signals with an effective delay of a given magnitude;
   a luminance channel including:
   1. a delay line coupled to said source of composite video signals, said delay line having a plurality of terminals for providing a plurality of delayed video signals, said plurality of delayed video signals being delayed by different amounts;
   2. first means for combining two of said delayed video signals which differ in delay by a time interval substantially equal to $NT/2$, where T is a period at the frequency of the color subcarrier of said composite video signals and N is an integer greater than one, to produce a first combined signal;
   3. means for deriving a broadband signal from at least one other of said delayed video signals, said broadband signal having a delay between the delays of signals comprising said first combined signal and a delay magnitude substantially corresponding to said given magnitude of delay;
   4. second means for combining said broadband signal and said first combined signal to produce an output signal having first and second amplitude transition portions of a black-going direction and white-going direction, respectively; said delays of said two delayed video signals relative to said delay of said broadband signal being such that said luminance component is peaked at a frequency in said band of frequencies remote from said frequency of said color subcarrier, and said broadband signal, in conjunction with said first combined signal, being determinative of the bandwidth of said luminance channel; and
   means for combining said output signal with each of said plurality of color difference signals to form a plurality of color signals.

30. Apparatus including luminance and chrominance processing means for processing television video signals including luminance and chrominance signals, comprising:
   a source of video signals;
   signal delaying means coupled to said source of video signals, said signal delaying means having a plurality of terminals for providing delayed video signals, said delayed video signals being delayed by different amounts, and said signal delaying means further including a portion for substantially equalizing time delays of said luminance and chrominance signals respectively processed in said luminance and chrominance signal processing means;
   first means providing a first combined signal comprising the sum of at least two of said delayed video signals delayed from one another by a time interval substantially equal to $NT/2$, where T is the period of a signal to be attenuated and N is an integer greater than one, said first combined signal having a maximum absolute amplitude value at a predetermined frequency between 0 and $f$ determined by said time interval $NT/2$;
   means for deriving a broadband signal from at least one other of said delayed video signals, said broadband signal having an average delay between the delays of the signals comprising said first combined signal;
   second means for combining said broadband signal with said first combined signal to produce a second combined signal having first and second amplitude transition portions of a black-going direction and a white-going direction, respectively;
   means for adjusting the amplitude of said second combined signal to produce a resultant signal of the form of said second combined signal;
   third means for combining said broadband signal with said resultant signal to produce an output signal having controllably accentuated black-going and wite-going amplitude portions as determined by said first and second amplitude transition portions of said second combined signal; and wherein
   depeaking means for reducing the amplitude of said output signal below the amplitude of siad broadband signal at a frequency substantially equal to said predetermined frequency are coupled to said means for deriving a broadband signal.

* * * * *

UNITED STATES PATENT AND TRADEMARK OFFICE
CERTIFICATE OF CORRECTION

PATENT NO. : 4,041,531

DATED : August 9, 1977

INVENTOR(S): Joseph Peter Bingham

It is certified that error appears in the above-identified patent and that said Letters Patent is hereby corrected as shown below:

Col. 3, line 43, "issured" should read --issued--; line 66, "fro" should read --for--.  Col. 4, line 31, "the output at" should read --the output signal at--.  Col. 6, line 7, "horizontal periods" should read --horizontal retrace periods--; line 8, "those respective" should read --these respective--; line 28, "tops 38" should read --taps 38--; line 47, "network 42. shown in" should read --network 42.--; line 60, "as shownin" should read --as shown in--.  Col. 11, line 7, "1/2(a'xd')" should read --1/2(a'+d')--; line 42, "170 x 3.58MHz" should read --2/3 x 3.58 MHz--; line 52, "170 x 3.58MHz" should read --2/3 x 3.58 MHz--.  Col. 14, line 38, "38∝" should read --38c'--.  Col. 15, line 37, "Kvp" should read --$Kv_p$--.

Col. 16, line 44, "$v_o$a" should read --$v_o$ at--.  Col. 17, line 24, "$T_D' + T_1' + T_3'$" should read --$T_D' + T_1' + T_2' + T_3'$--.  Col. 18, line 1, "178" should read --1/2--; line 23, "cos 107 t'" should read --cosωt'--; line 28, "$P(\frac{R2}{R1 + R2} \cos\omega t'$" should read -- $P(\frac{R2}{R1 + R2} \cos 3\omega t$--.  Col. 19, line 3, "1/4t" should read --1/4t'--; line 17, "trolled by be" should read --trolled to be--.  Col. 26, line 58, "wite-going" should read --white-going--; line 62, "siad" should read --said--.

Signed and Sealed this

Fifteenth Day of May 1979

[SEAL]

Attest:

RUTH C. MASON
*Attesting Officer*

DONALD W. BANNER
*Commissioner of Patents and Trademarks*